(12) United States Patent
Lessing et al.

(10) Patent No.: US 12,145,259 B2
(45) Date of Patent: *Nov. 19, 2024

(54) SOFT ROBOTIC ACTUATOR ENHANCEMENTS

(71) Applicant: SOFT ROBOTICS, INC., Bedford, MA (US)

(72) Inventors: Joshua Aaron Lessing, Cambridge, MA (US); Ryan Knopf, Cambridge, MA (US); Carl Vause, Concord, MA (US)

(73) Assignee: SOFT ROBOTICS, INC., Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/349,270

(22) Filed: Jul. 10, 2023

(65) Prior Publication Data
US 2023/0405843 A1    Dec. 21, 2023

Related U.S. Application Data

(63) Continuation of application No. 17/461,167, filed on Aug. 30, 2021, now Pat. No. 11,738,471, which is a
(Continued)

(51) Int. Cl.
*B25J 15/00* (2006.01)
*B25J 15/10* (2006.01)
*B25J 15/12* (2006.01)

(52) U.S. Cl.
CPC ........... *B25J 15/12* (2013.01); *B25J 15/0023* (2013.01); *B25J 15/0071* (2013.01); *B25J 15/10* (2013.01)

(58) Field of Classification Search
CPC ............... B25J 15/0023; B25J 15/0408; B25J 15/0475; B25J 15/10; B25J 15/12; B25J 9/142; B65G 47/908
See application file for complete search history.

(56) References Cited

U.S. PATENT DOCUMENTS 3,343,864 A * 9/1967 James ................. B25J 15/12
                                                  92/92
3,601,442 A * 8/1971 Orndorff ............. B25J 15/12
                                                  92/92

(Continued)

FOREIGN PATENT DOCUMENTS

JP        2004181585 A * 7/2004

*Primary Examiner* — Dean J Kramer
(74) *Attorney, Agent, or Firm* — GOODWIN PROCTER LLP

(57) ABSTRACT

Exemplary embodiments provide enhancements for soft robotic actuators. In some embodiments, angular adjustment systems are provided for varying an angle between an actuator and the hub, or between two actuators. The angular adjustment system may also be used to vary a relative distance or spacing between actuators. According to further embodiments, rigidizing layers are provided for reinforcing one or more portions of an actuator at one or more locations of relatively high strain. According to further embodiments, force amplification structures are provided for increasing an amount of force applied by an actuator to a target. The force amplification structures may serve to shorten the length of the actuator that is subject to bending upon inflation. According to still further embodiments, gripping pads are provided for customizing an actuator's gripping profile to better conform to the surfaces of items to be gripped.

20 Claims, 21 Drawing Sheets

Related U.S. Application Data continuation of application No. 16/210,315, filed on Dec. 5, 2018, now Pat. No. 11,110,616, which is a continuation of application No. 14/944,999, filed on Nov. 18, 2015, now Pat. No. 10,189,168, which is a continuation-in-part of application No. 14/857,648, filed on Sep. 17, 2015, now Pat. No. 10,118,301.

(60) Provisional application No. 62/081,323, filed on Nov. 18, 2014.

(56) References Cited

U.S. PATENT DOCUMENTS

| | | | | |
|---|---|---|---|---|
| 3,640,564 | A * | 2/1972 | Kuster | B25B 11/00 |
| | | | | 294/200 |
| 4,636,135 | A * | 1/1987 | Bancon | B25J 15/0491 |
| | | | | 483/901 |
| 4,850,631 | A * | 7/1989 | Dotsko | B25J 15/12 |
| | | | | 414/730 |
| 5,090,758 | A * | 2/1992 | Lord | B25J 15/0023 |
| | | | | 294/98.1 |
| 5,156,081 | A * | 10/1992 | Suzumori | B25J 15/12 |
| | | | | 92/92 |
| 5,317,956 | A * | 6/1994 | Devenish | F15B 15/10 |
| | | | | 92/92 |
| 5,568,957 | A * | 10/1996 | Haugs | B25J 15/12 |
| | | | | 294/98.1 |
| 5,807,378 | A * | 9/1998 | Jensen | B25J 15/04 |
| | | | | 606/1 |
| 6,178,872 | B1 * | 1/2001 | Schulz | B25J 9/142 |
| | | | | 92/92 |
| 6,484,601 | B1 * | 11/2002 | Arrichiello | B25J 9/14 |
| | | | | 92/37 |
| 6,718,766 | B2 * | 4/2004 | Seto | F15B 15/18 |
| | | | | 92/48 |
| 6,846,029 | B1 * | 1/2005 | Ragner | B25B 9/00 |
| | | | | 294/219 |
| 7,794,171 | B2 * | 9/2010 | Park | B25J 3/04 |
| | | | | 403/349 |
| 9,314,933 | B2 * | 4/2016 | Calisti | B25J 15/12 |
| 9,332,768 | B2 * | 5/2016 | Goodyear, Jr. | A22C 21/022 |
| 9,492,930 | B2 * | 11/2016 | Galloway | B25J 15/12 |
| 9,506,455 | B2 * | 11/2016 | Mazzeo | B25J 9/1075 |
| 9,598,192 | B2 * | 3/2017 | Yoshikane | B65B 3/045 |
| 9,790,968 | B2 * | 10/2017 | Yang | F15B 15/103 |
| 9,797,415 | B2 * | 10/2017 | Martinez | B25J 9/142 |
| 9,981,377 | B2 * | 5/2018 | Morin | B25J 9/142 |
| 10,087,020 | B1 * | 10/2018 | Ruiz | B25J 15/0616 |
| 10,189,168 | B2 * | 1/2019 | Lessing | B25J 15/10 |
| 10,308,038 | B2 * | 6/2019 | Hoover | B25J 15/0616 |
| 10,357,883 | B1 * | 7/2019 | O'Connor | B25J 15/0616 |
| 11,110,616 | B2 * | 9/2021 | Lessing | B25J 15/0023 |
| 11,738,471 | B2 * | 8/2023 | Lessing | B25J 15/0071 |
| | | | | 294/208 |
| 2005/0218679 | A1 * | 10/2005 | Yokoyama | B25J 9/142 |
| | | | | 294/99.1 |
| 2006/0028041 | A1 * | 2/2006 | Ono | B25J 9/142 |
| | | | | 294/119.3 |
| 2007/0144299 | A1 * | 6/2007 | Okazaki | B25J 9/142 |
| | | | | 623/24 |
| 2011/0193362 | A1 * | 8/2011 | Prahlad | B25J 15/00 |
| | | | | 294/81.2 |
| 2013/0298759 | A1 * | 11/2013 | Rotinat-Libersa | B25J 18/06 |
| | | | | 92/90 |
| 2015/0272749 | A1 * | 10/2015 | Amend, Jr. | A61F 2/588 |
| | | | | 623/64 |
| 2015/0360372 | A1 * | 12/2015 | Schiettecatte | B25J 9/0015 |
| | | | | 156/60 |
| 2017/0036355 | A1 * | 2/2017 | Lessing | B25J 15/12 |
| 2017/0072572 | A1 * | 3/2017 | Wagner | B25J 15/0023 |
| 2018/0117773 | A1 * | 5/2018 | Odhner | B25J 15/0009 |
| 2019/0263002 | A1 * | 8/2019 | Herrström | B25J 15/0023 |

* cited by examiner

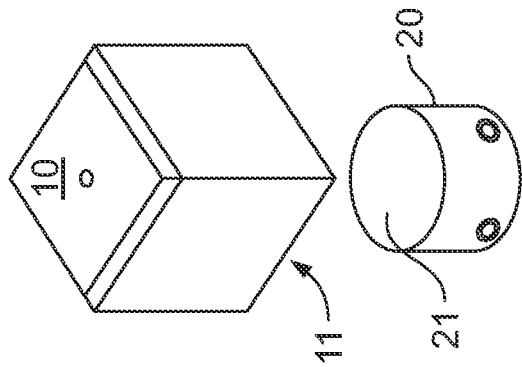
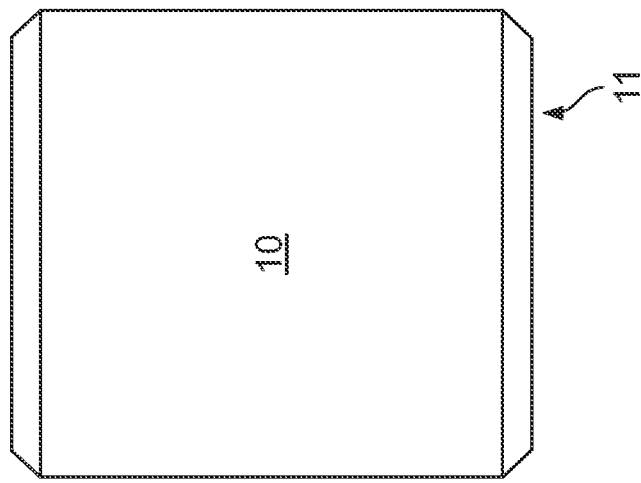
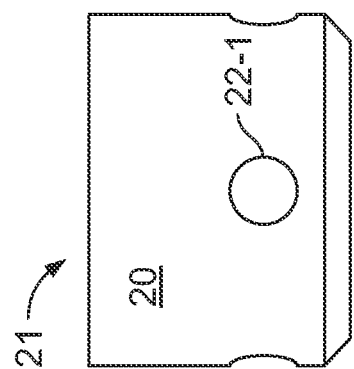
FIG. 2A
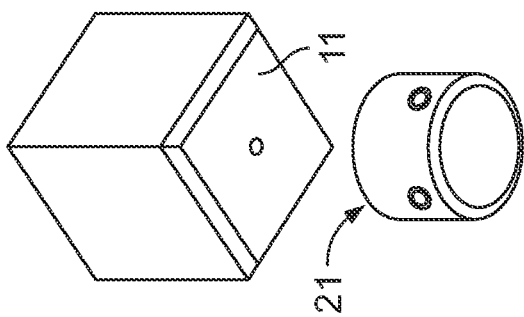
FIG. 2C
FIG. 2B

SOFT ROBOTIC ACTUATOR ENHANCEMENTS

RELATED APPLICATIONS

The present application is a continuation of U.S. patent application Ser. No. 17/461,167, filed on Aug. 30, 2021, which is a continuation of U.S. patent application Ser. No. 16/210,315, filed on Dec. 5, 2018 and entitled "Soft Robotic Actuator Enhancements," which is a continuation of U.S. patent application Ser. No. 14/944,999, filed on Nov. 18, 2015 and entitled "Soft Robotic Actuator Enhancements," which is a continuation-in-part of U.S. patent application Ser. No. 14/857,648, filed on Sep. 17, 2015 and entitled "Soft Robotic Actuator Attachment Hub and Grasper Assembly, Reinforced Actuators, and Electroadhesive Actuators", and claims priority to U.S. Provisional Patent Application Ser. No. 62/081,323, filed on Nov. 18, 2014 and entitled "Soft Robotic Actuator Enhancements," the contents of each of which are incorporated herein by reference.

FIELD OF THE DISCLOSURE

The disclosure relates generally to the field of robotics and particularly to hubs and assemblies for interfacing soft robotic actuators with another mechanical system, and to enhancements for soft robotic actuator systems.

BACKGROUND

Robotics are used in many industries, such as industrial applications (e.g., manufacturing and packaging), medical applications, and the like. Soft robotics is a developing area of robotics that provides soft, conformal, and adaptive graspers and actuators to enable robots to interact with objects in a more adaptive manner than in traditional robotics. For example, a single grasper may adapt to the size, weight, and shape of varying objects in each task, just as the human hand can.

A magnetic assembly to combine "hard" and "soft" robotics has been disclosed in *A Hybrid Combining Hard and Soft Robotics*, Stokes Adam A., Shepherd Robert F., Morin Stephen A., Ilievski Filip, and Whitesides George M., Soft Robotics. Mar. 2014, 1(1): 70-74. doi:10.1089/soro.2013.0002, which article is incorporated herein by reference in its entirety. However, the proposed combination of hard and soft robotics does not provide the versatility necessary to operate similar to a human.

The present disclosure is directed to the above, and other, limitations of existing systems. In particular, the present disclosure provides improvements in interfacing hard and soft robotics and also provides improved actuators.

BRIEF DESCRIPTION OF THE DRAWINGS

FIGS. 2A-2C are exploded views of the hub assembly of FIG. 1.

SUMMARY

Figure 1:
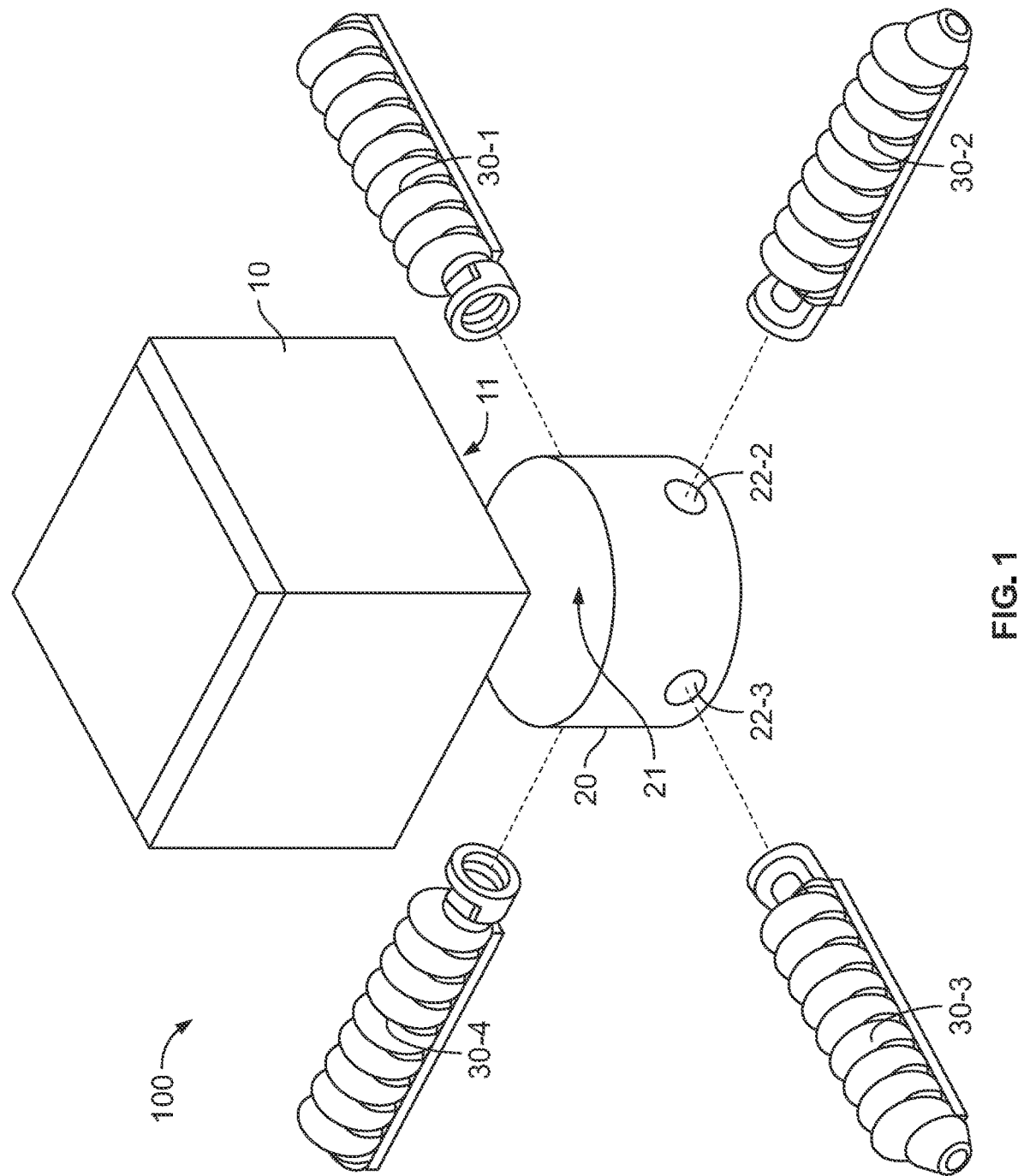
FIG. 1 is a perspective view illustrating an exemplary embodiment of a hub assembly and soft robotic actuators in accordance with various examples of the present disclosure.

According to exemplary embodiments, angular adjustment systems are provided for varying an angle between an actuator and the hub, or between two actuators. The angular adjustment system may also be used to vary a relative distance or spacing between actuators. Such a system allows for a robotic manipulator to be dynamically adjusted without the need to replace the individual actuators or the entire manipulator. Accordingly, a manipulator can be varied to grasp objects of different sizes and shapes.

According to further embodiments, rigidizing layers are provided for reinforcing one or more portions of an actuator. In some cases, reinforcements may be placed at areas of relatively high strain, which may help to prevent premature failure of the actuator. For example, laces may be provided for preventing certain regions from expanding. In other situations, reinforcement can be used to prevent the base wall of the actuator from bending away from the neutral bending plane, which allows the actuator to bend more effectively. In both cases, the actuator may be capable of accommodating higher inflation pressures. At higher inflation pressures, more force can be applied to a target.

According to further embodiments, force amplification structures are provided for increasing the amount of force applied by an actuator to a target. In some embodiments the force amplification structures serves to shorten the length of the actuator utilized when gripping an object. Since more force is required to deflect a shorter actuator an equal distance as a longer actuator of the same cross section, shortening the actuator through the use of a force amplification structure has the effect of increasing the force required to deflect the actuators of a gripper when grasping a given target object. The higher force required to deflect the shorter fingers during gripping yields a higher grip force applied to the target object than what would be given by the effectively longer actuators that are not reinforced by a force amplification structure. Moreover, the force amplification structures may stabilize the actuator(s) against twisting and overlapping.

According to further embodiments, gripping pads are provided for customizing an actuator's gripping profile to better conform to the surfaces of items to be gripped. The gripping pads may have a textured surface that may be added to, or built into (e.g., by molding) the actuator(s). An individual actuator may include multiple different pads that each contact a gripped item in a desired manner or in a desired location.

These and other advantages of the exemplary embodiments will be apparent from the detailed description below.

DETAILED DESCRIPTION OF THE PREFERRED EMBODIMENTS

The present invention will now be described more fully hereinafter with reference to the accompanying drawings, in which preferred embodiments of the invention are shown. The invention, however, may be embodied in many different forms and should not be construed as being limited to the embodiments set forth herein. Rather, these embodiments are provided so that this disclosure will be thorough and complete, and will fully convey the scope of the invention to those skilled in the art. In the drawings, like numbers refer to like elements throughout.

Multiple enhancements to soft actuators and actuator hub assemblies are discussed herein. For ease of discussion, each of these concepts is described below in separate sections. However, it is to be understood that the embodiments described herein may be used together in any combination in order to achieve the benefits described herein.

A general overview of a soft robotic system in which the above-noted enhancements may be employed is now described with reference to FIGS. 1 through 5C.

System Overview

Conventional robotic grippers or actuators may be expensive and incapable of operating in certain environments where the uncertainty and variety in the weight, size and shape of the object being handled has prevented automated solutions from working in the past. The present application describes applications of novel soft robotic actuators that are adaptive, inexpensive, lightweight, customizable, and simple to use.

Soft robotic actuators may be formed of elastomeric materials, such as rubber, or thin walls of plastic arranged in an accordion structure that is configured to unfold under pressure, or other suitable relatively soft materials. They may be created, for example, by molding one or more pieces of the elastomeric material into a desired shape. Soft robotic actuators may include a hollow interior that can be filled with a fluid, such as air, water, or saline to inflate and actuate the actuator. Upon actuation, the shape or profile of the actuator changes. In the case of an accordion-style actuator (described in more detail below), actuation may cause the actuator to curve or straighten into a predetermined target shape. One or more intermediate target shapes between a fully unactuated shape and a fully actuated shape may be achieved by partially inflating the actuator. Alternatively or in addition, the actuator may be actuated using a vacuum to remove inflation fluid from the actuator and thereby change the degree to which the actuator bends and/or extends.

Actuation may also allow the actuator to exert a force on an object, such as an object being grasped or pushed. However, unlike traditional hard robotic actuators, soft actuators maintain adaptive properties when actuated such that the soft actuator can partially or fully conform to the shape of the object being grasped. Furthermore, the amount of force applied can be spread out over a larger surface area in a controlled manner because the material can easily deform. In this way, soft robotic actuators can grip objects without damaging them.

Moreover, soft robotic actuators allow for new types of motions or combinations of motions (including bending, twisting, extending, and contracting) that can be difficult or impossible to achieve with traditional hard robotic actuators.

In accordance with the present disclosure, a hub and/or grasper assembly for interfacing soft robotic actuators with hard robotic assemblies is provided. Additionally, new configurations and types of actuators are described. The actuators may be used with the hub and/or grasper assembly.

An actuator may be a soft robotic actuator, which is inflatable with an inflation fluid such as air, water, or saline. The inflation fluid may be provided via an inflation device through a fluidic connection. The actuator may be in an uninflated state in which a limited amount of inflation fluid is present in the actuator at substantially the same pressure as the ambient environment. The actuator may also be in a fully inflated state in which a predetermined amount of inflation fluid is present in the actuator (the predetermined amount corresponding to a predetermined maximum force to be applied by the actuator or a predetermined maximum pressure applied by the inflation fluid on the actuator). The actuator may also be in a full vacuum state, in which all fluid is removed from the actuator, or a partial vacuum state, in which some fluid is present in the actuator but at a pressure that is less than the ambient pressure. Furthermore, the actuator may be in a partially inflated state in which the actuator contains less than the predetermined amount of inflation fluid that is present in the fully inflated state, but more than no (or very limited) inflation fluid.

In the inflated state, the actuator may curve around a central axis. For ease of discussion, several directions are defined herein. An axial direction passes through the central axis around which the actuator curves. A radial direction extends in a direction perpendicular to the axial direction, in the direction of the radius of the partial circle formed by the inflated actuator. A circumferential direction extends along a circumference of the inflated actuator.

In the inflated state, the actuator may exert a force in the radial direction along the inner circumferential edge of the actuator. For example, the inner side of the distal tip of the actuator exerts a force inward, toward the central axis. The soft robotic actuator may remain relatively conformal when inflated, due to the materials used and the general construction of the actuator.

The actuator may be made of one or more elastomeric materials that allow for a relatively soft or conformal construction. Depending on the application, the elastomeric materials may be selected from a group of food-safe, biocompatible, or medically safe, FDA-approved materials. The actuator may be manufactured in a Good Manufacturing Process ("GMP")-capable facility.

The actuator may include a base that is substantially flat. The actuator may also include one or more accordion extensions. The accordion extensions allow the actuator to bend or flex when inflated, and help to define the shape of the actuator when in an inflated state. The accordion extensions include a series of ridges and troughs. The size of the accordion extensions and the placement of the ridges and troughs can be varied to obtain different shapes or extension profiles.

By changing the shape of the body of the actuator, or the size, position, or configuration of the accordion extensions, different sizes, shapes, and configurations may be achieved. Moreover, varying the amount of inflation fluid provided to the actuator allows the actuator to take on one or more intermediate sizes or shapes between the un-inflated state and the inflated state. Thus, an individual actuator can be scalable in size and shape by varying inflation amount, and an apparatus including an actuator can be further scalable in size and shape by replacing one actuator with another actuator having a different size, shape, or configuration.

The actuator extends from a proximal end to a distal end. The proximal end may optionally connect to an interface. The interface allows the actuator to be releasably coupled to other parts of the hub assembly. The interface may be made of stainless steel, aluminum, plastic, or a food-safe or medically-safe material, such as Acrylonitrile-Butadiene-Styrene ("ABS") or Delrin. The interface may be releasably coupled to one or both of the actuator and a fluidic interface to the hub. The interface may have a port for connecting to the actuator. Different interfaces may have different sizes, numbers, or configurations of actuator ports, in order to accommodate larger or smaller actuators, different numbers of actuators, or actuators in different configurations.

The actuator may be inflated with an inflation fluid supplied from an inflation device through the fluidic connection. The interface may include or may be attached to a valve for allowing fluid to enter the actuator but preventing the fluid from exiting the actuator (unless the valve is opened). The fluidic connection may also or alternatively attach to an inflator valve at the inflation device for regulating the supply of inflation fluid at the location of the inflation device.

The inflation fluid may be, for example, air, water, or saline. In the case of air, the inflation device may include a bulb or bellows for supplying ambient air. In the case of saline, the inflation device may include a syringe or other appropriate fluid delivery system. Alternatively or in addition, the inflation device may include a compressor, pump, regulator, or tank of compressed or liquefied gas for supplying the inflation fluid.

For example, the inflation device may include a fluid supply for supplying an inflation fluid. In one embodiment, the fluid supply may be a reservoir for storing compressed air or saline, or may be a vent for supplying ambient air to the fluidic connection.

The inflation device may further include a fluid delivery device, such as a pump, regulator, or compressor, for supplying inflation fluid from the fluid supply to the actuator through the fluidic connection. The fluid delivery device may be capable of supplying fluid to the actuator or withdrawing the fluid from the actuator (e.g., through a vacuum or similar operation). The fluid delivery device may be powered by electricity. To supply the electricity, the inflation device may include a power supply, such as a battery or an interface to an electrical outlet.

The power supply may also supply power to a control device. The control device may allow a user to control the inflation or deflation of the actuator, e.g. through one or more actuation buttons (or alternative devices, such as a switch). The control device may include a controller for sending a control signal to the fluid delivery device to cause the fluid delivery device to supply inflation fluid to, or withdraw inflation fluid from, the actuator.

The above described components may be connected together using a hub. Referring to FIG. 1, an exemplary hub 100 in accordance with the present disclosure is shown. The hub 100 includes a master side assembly 10 and a tool side assembly 20. In general, the master side assembly 10 may be connected or connectable to a mechanical assembly, such as a robotic arm, a robotic gantry system, a robotic manipulator, or in general any end effector of a robotic (e.g., hard robotics) assembly. The tool side assembly 20 may be configured to operably connect a number a of various soft actuators (where a is a positive integer). In particular, the tool side assembly 20 may be provided with a number b of actuator attachment portions (where b is a positive number). It is important to note, that the tools side assembly 20 may be configured connect any number of soft actuators. However, for convenience and clarity, a number of soft actuators (e.g., 30-1, 30-2, 30-3, and 30-4) and a number of actuator attachment portions (e.g., 20-1, 20-2, 20-3, and 20-4) are depicted in the figures. Additionally, it is important to note that the number b of actuator attachment portions may be different than the number a of actuators connected to the tool side assembly 20.

In general, each of the master side assembly 10 and the tool side assembly 20 include an interface configured to releasably couple the assemblies 10 and 20 to each other. In particular, the tool side assembly 20 includes an interface portion 21 while the master side assembly includes an interface portion 11 (obscured by the angle of viewing). The interface portions 11 and 21 can be configured to couple the assemblies 10 and 20 and to provide a seal for inflation line (e.g., pneumatic, hydraulic, or the like) connections, electrical connections, or other connections.

FIGS. 2A-2C depict an exploded view of the hub 100 from various perspectives. In particular, FIG. 2A illustrates the hub 100 from a straight on side view showing the master side assembly 10 and the tool side assembly 20. Furthermore, actuator attachment portion 22-1 is shown in the tool side assembly 20. Additionally, the interface portions 11 and 21 are shown. FIG. 2B illustrates the hub 100 from an angled bottom up perspective view showing the master side assembly 10 and the tool side assembly 20. Furthermore, actuator attachment portion 22-1 and 22-2 are shown in the tool side assembly 20. FIG. 2B illustrates the hub 100 from an angled bottom up perspective view showing the master side assembly 10 and the tool side assembly 20. Furthermore, actuator attachment portion 22-1 and 22-2 are shown in the tool side assembly 20. Additionally, the interface portions 11 and 21 are shown. FIG. 2C illustrates the hub 100 from an angled top down perspective view showing the master side assembly 10 and the tool side assembly 20. Furthermore, actuator attachment portion 22-1 and 22-2 are shown in the tool side assembly 20. Additionally, the interface portions 11 and 21 are shown.

It is to be appreciated, that areas of the interface portions 11 and 21 are depicted in FIG. 1 and FIGS. 2A-2C. However, the interface portions may have a variety of configurations and the interface portion should not be limited by that depicted in FIG. 1 and FIGS. 2A-2C.

Figure 3B:
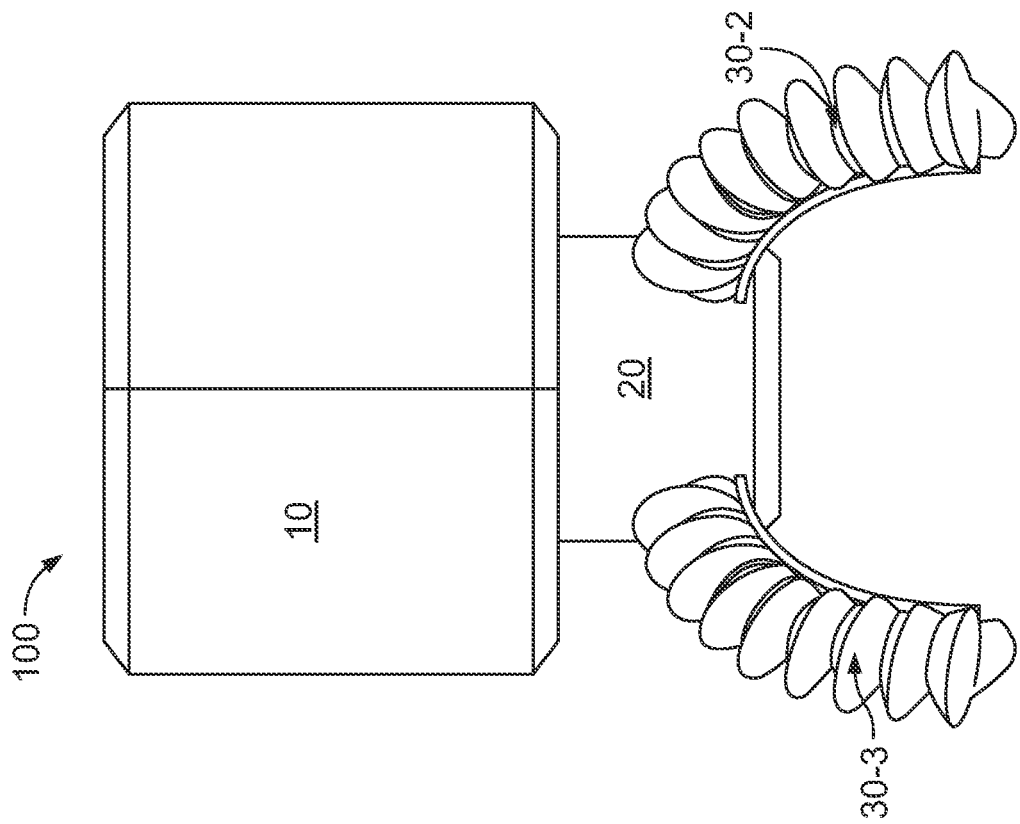
FIGS. 3A-3E are assembled views of the hub assembly and soft robotic actuators of FIG. 1.
Figure 3A:
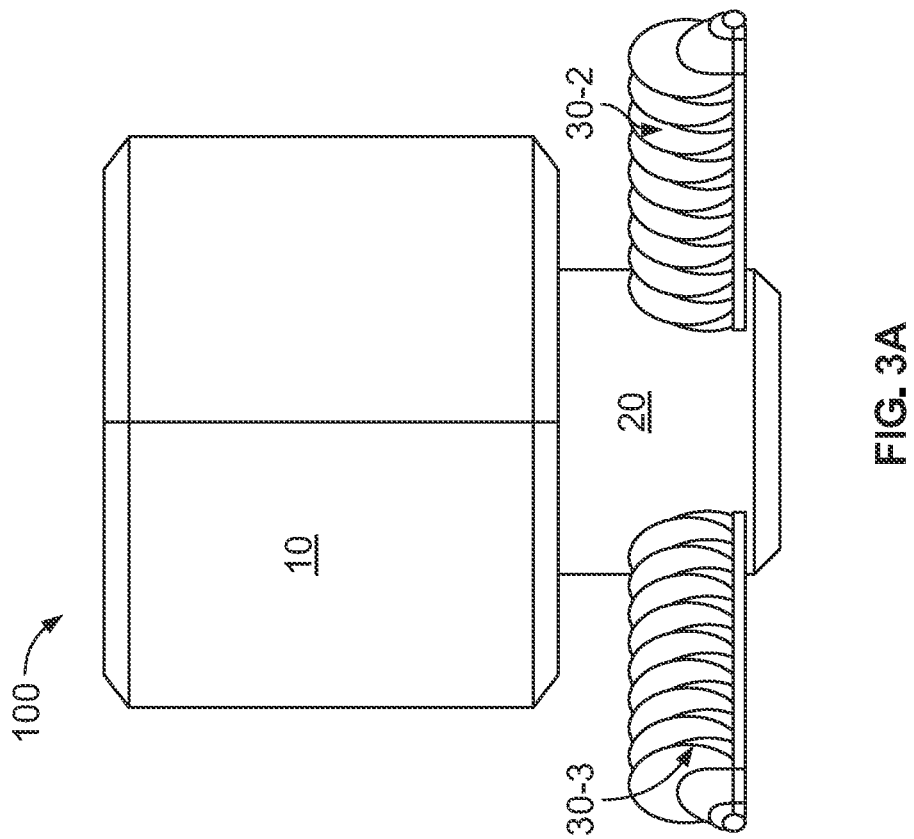
Figure 3E:
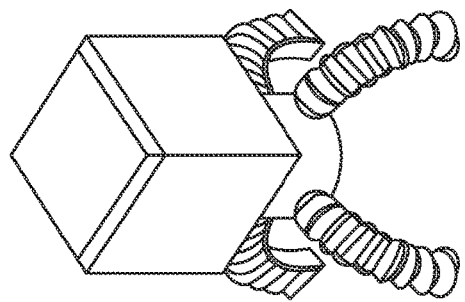
Figure 3C:
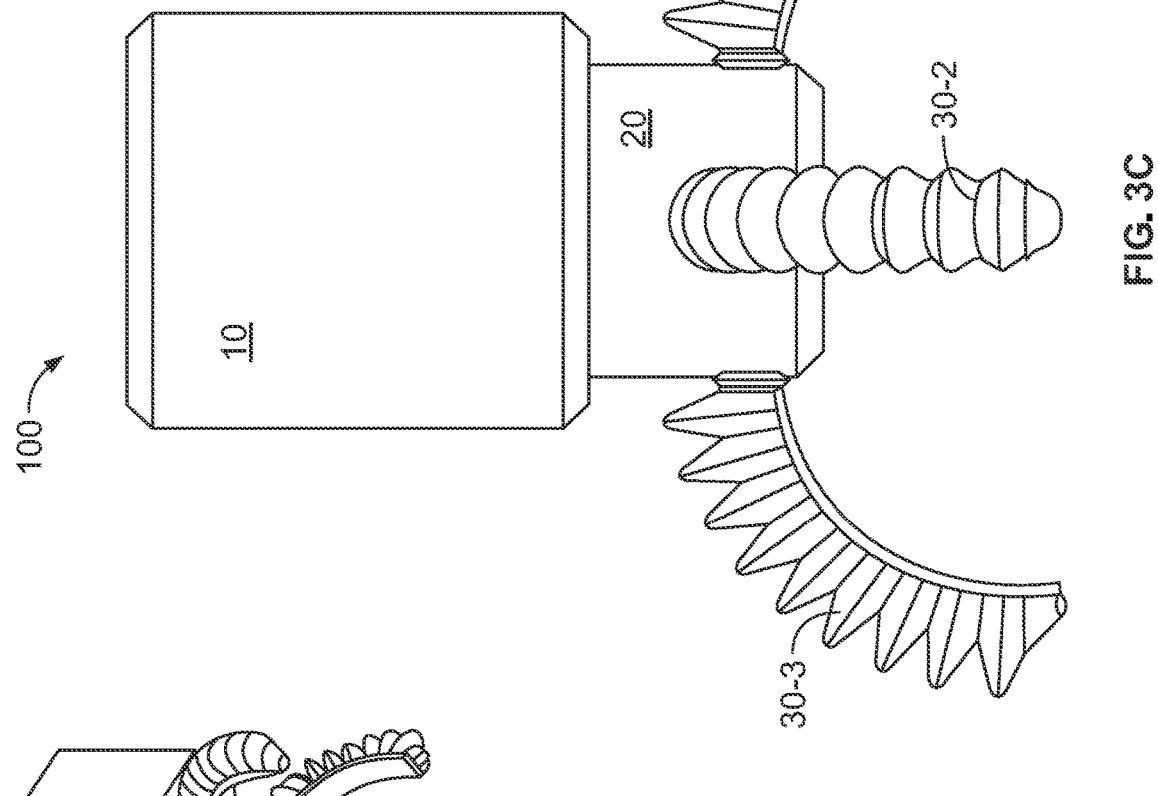
Figure 3D:
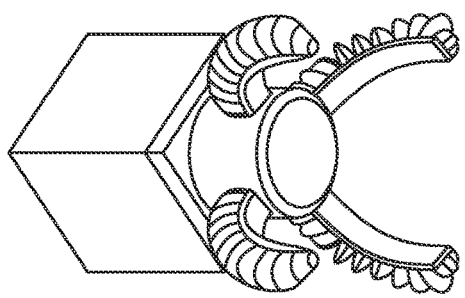

FIGS. 3A-3E depict an assembled view of the hub 100 and attached actuators 30 from various perspectives. In particular, FIG. 3A illustrates the hub 100 from a straight on side view showing the master side assembly 10 and the tool side assembly 20. Furthermore, actuators 30-2 and 30-3 are shown attached to the tool side assembly 20. Actuators 30-2 and 30-3 are depicted in a "neutral" position (e.g., not inflated, deflated, or the like). FIG. 3B illustrates the hub 100 from a straight on side view showing the master side assembly 10 and the tool side assembly 20 and the attached actuators 30-2 and 30-3 in an inflated state. FIG. 3C illustrates the hub 100 from an angled side view while FIGS. 3D and 3E show the hub 100 from an angled bottom up and tom down (respectively) perspective view. In particular, the assemblies 10 and 20 are shown coupled together with actuators 30-1, 30-2, 30-3, and 30-4 attached to the tool side assembly and depicted as inflated.

Accordingly, the hub assembly 100 can be used to quickly switch between various grasper assemblies by changing the tool side assembly 20. Example grasper assemblies are now described. It is important to note, that a system may be implemented with one master side assembly 10 and multiple the tool side assemblies 20 each with a different grasper configuration. As such, the system can be quickly reconfigured and used to perform different operations needing different graspers or soft actuators.

Figure 4C:
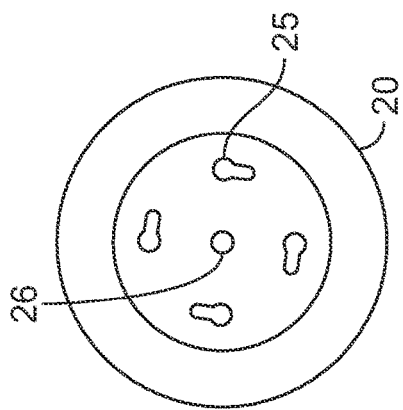
FIGS. 4A-4D are perspective views illustrating an exemplary twist lock interface for the hub assembly of FIG. 1.
Figure 4D:
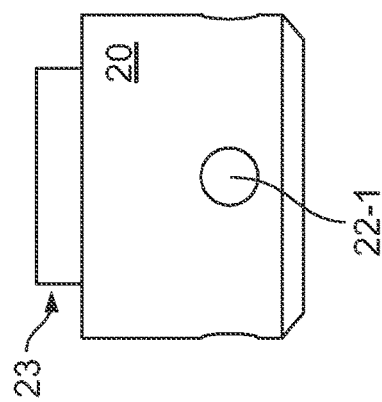
Figure 4A:
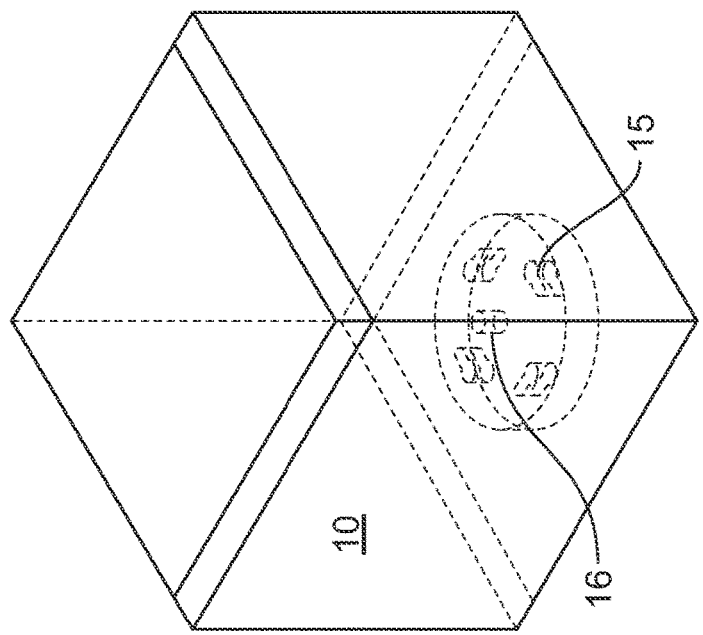
Figure 4A:
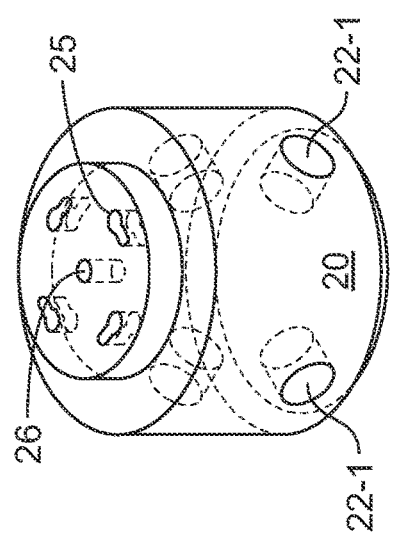

FIGS. 4A-4D depict an example of the hub assembly 100 including a twist lock interface. In particular, FIG. 4A illustrates an exploded top down perspective view of the hub assembly 100 showing the master side assembly 10 and the tool side assembly 20. Furthermore, actuator attachment portions (e.g., 22-1) are shown in the tool side assembly 20. Furthermore, details of the interface portions 11 and 21 are shown. In particular, the interface portion 11 includes pegs 15 and connection port 16 while the interface portion 21 includes slots 25 and connection port 26. The pegs and the slots are configured to be releasably secured to each other. In particular, the slots 25 may have a varying diameter, where one end of each slot is proportioned to receive an end of a corresponding one of the pegs 15. Once the pegs 15 are fit into the slots 25, either the assembly 10 or the assembly 20 may be twisted to lock the pegs 15 in place, thereby securing the assembly 10 to the assembly 20.

Figure 4B:
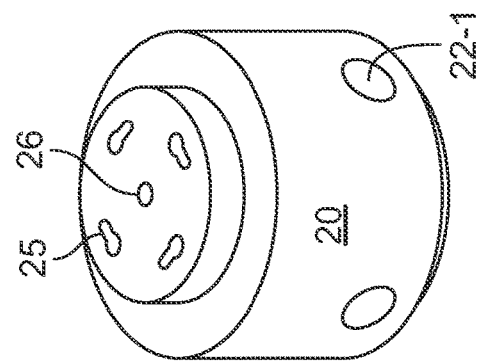

FIGS. 4B-4C illustrate a top perspective and a top down (respectively) view of the tool side assembly 20. As can be seen, the tool side assembly 20 includes actuator attachment portions (e.g., 22-1), slots 25, and connection port 26. FIG. 4D illustrates a side view of the tool side assembly 20. As can be seen, the tool side assembly 20 may include a top stepped or recessed portion 23 configured to fit into a corresponding recessed portion in the interface portion 11 of the master side assembly 10.

Additionally, the connection ports 16 and 26 may seal or form a seal when the assemblies 10 and 20 are secured together. As such, a sealed pathway or connection point for inflation lines (e.g., pneumatic, hydraulic, or the like) as well as electrical signal lines can be provided through the connection points 16 and 26.

Alternatively or in addition, the tool side assembly 20 may be secured to the master side assembly 10 through a magnetic interface, an electrostatic adhesion interface, or any other suitable type of interface.

The hub may be adjustable in a number of ways in order to adjust the angle of the actuators and/or the relative distance between the actuators. Exemplary embodiments of such hubs and actuators are next described.

Angular and Relative Distance Adjustment

Adjustable hubs may allow for the pitch spread, number, or type of actuators to be actuated or adjusted. Such hubs may allow for the angle of actuators to be changed relative to one another, or for actuators to be moved linearly relative to one another to thereby adjust the spacing between actuators. The adjustment of these parameters may be performed automatically, using a control device, or manually in response to manipulation by an operator. In either case (automatic or manual adjustment), the adjustment may be performed dynamically, without the need to remove the actuator from the hub or to replace the actuator with a different actuator having different characteristics.

Figure 5A:
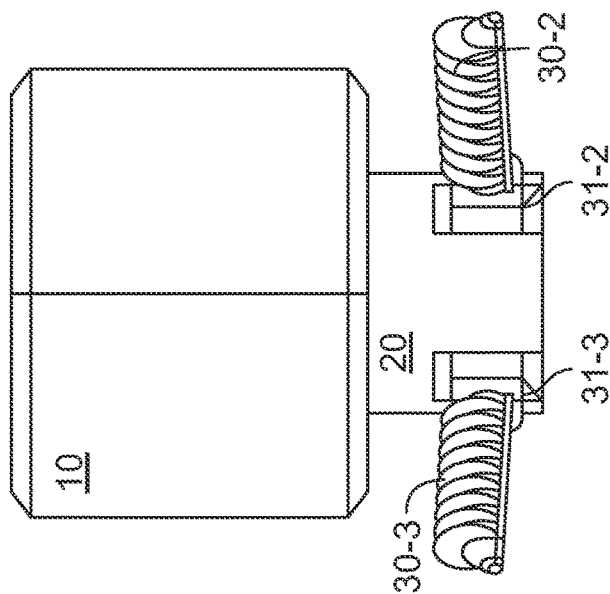
FIGS. 5A-5C are perspective views illustrating an example grasper using the hub assembly of FIG. 1 and soft actuators having mechanical or electro-mechanical portions.
Figure 5B:
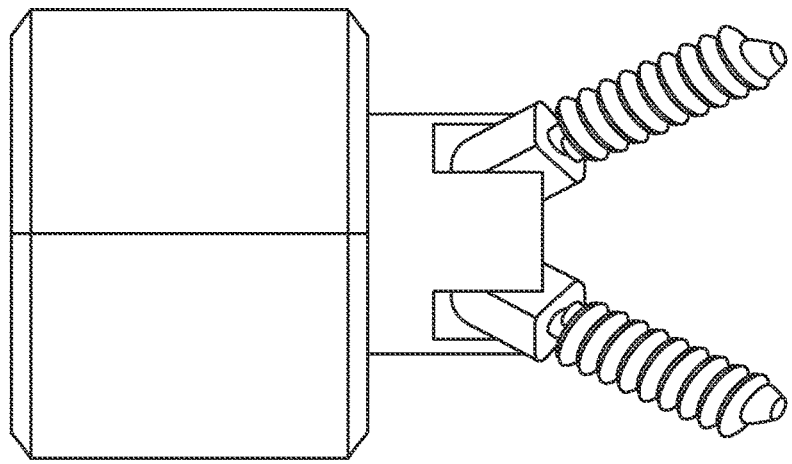
Figure 5C:
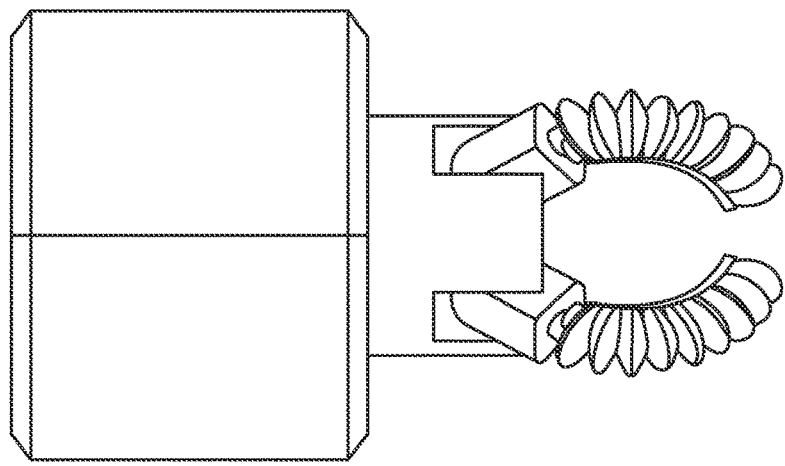

FIGS. 5A-5C illustrate an example hub assembly 100 and an example configuration of soft actuators 30-1, 30-2, 30-3 that include an electro-mechanical portion 31-1, 31-2, 31-3. As shown, the electro-mechanical portion 31-1, 31-2, 31-3 can be activated to rotate an actuator inwards towards the center of the hub assembly 100 or outward away from the center of the hub assembly 100. By changing the angle of the electro-mechanical portion 31-1, 31-2, 31-3 relative to the hub assembly 100, the angle of the actuators can be changed relative to the hub assembly 100 and therefore relative to each other. The electromechanical portions 31-1, 31-2, 31-3 can be used to modify and/or adjust the angle of attack of the actuators from when they are in the neutral position (e.g., refer to FIGS. 5A-5B) to when they are in the inflated position (e.g., refer to FIG. 5C). By adjusting the angle of attack, the actuators can be configured to grasp objects of varying sizes or configurations.

Alternatively or in addition to an electro-mechanical portion 31-1, 31-2, 31-3 (e.g., a motor), the portion of the apparatus that adjusts the angle of the actuators may be mechanical (e.g., a hand-driven crank), fluidic (e.g., hydraulic or pneumatic, such as a pneumatically-driven rotational actuator), or any combination of these or other suitable adjustment techniques.

Figure 6A:
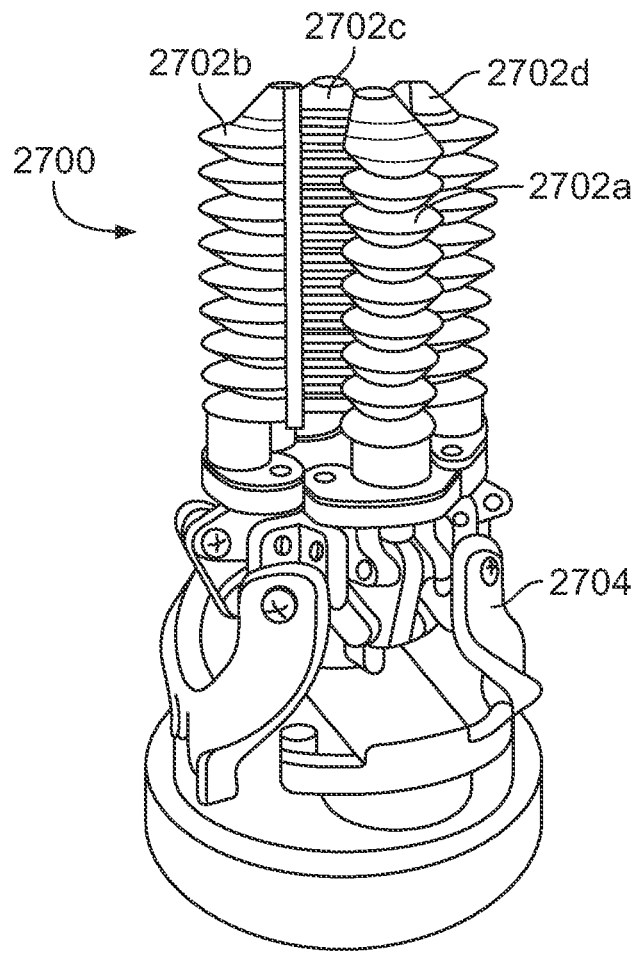
FIGS. 6A-6E are perspective views illustrating a grasper using the hub assembly of FIG. 1 and soft actuators having a configurable angle of attack.
Figure 6B:
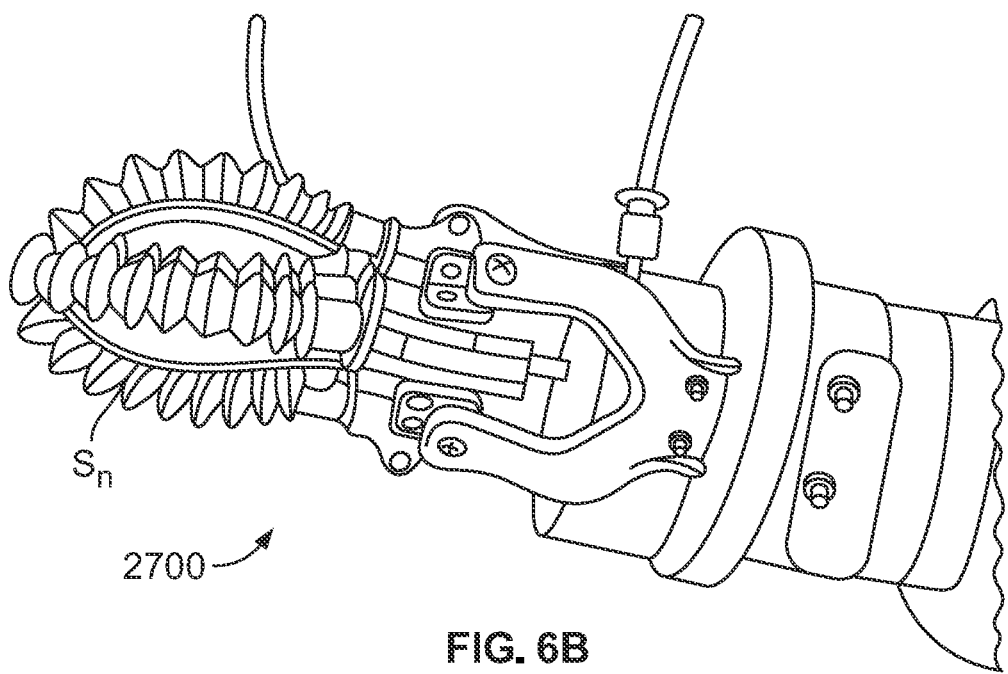
Figure 6C:
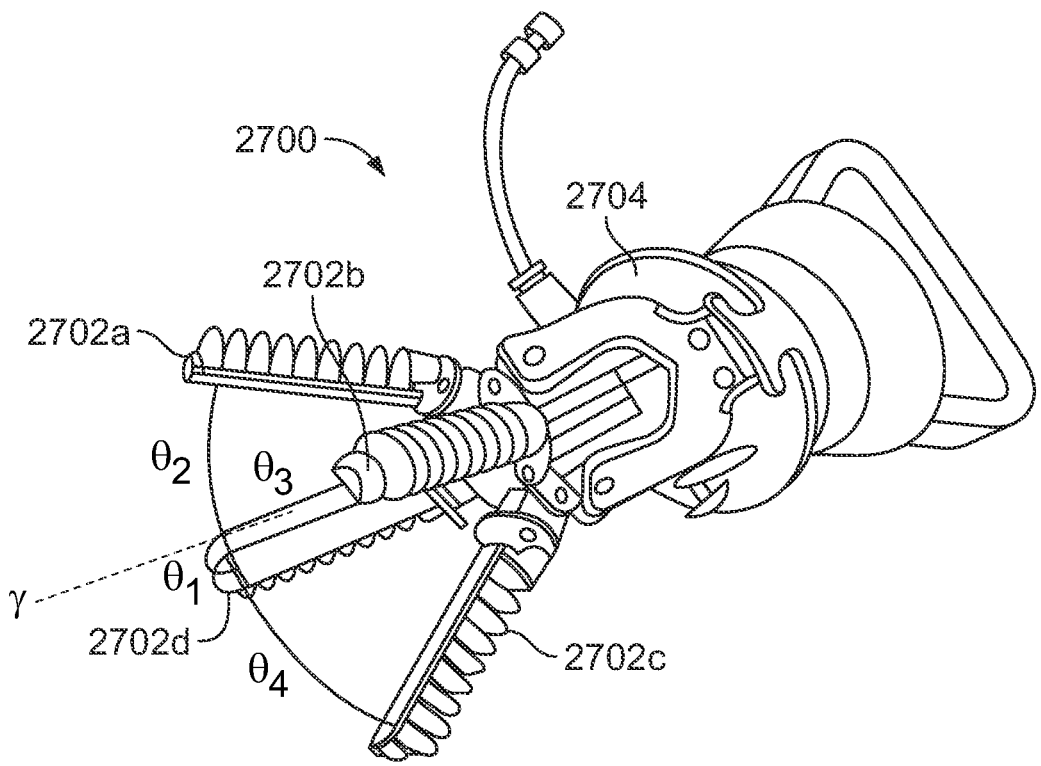
Figure 6D:
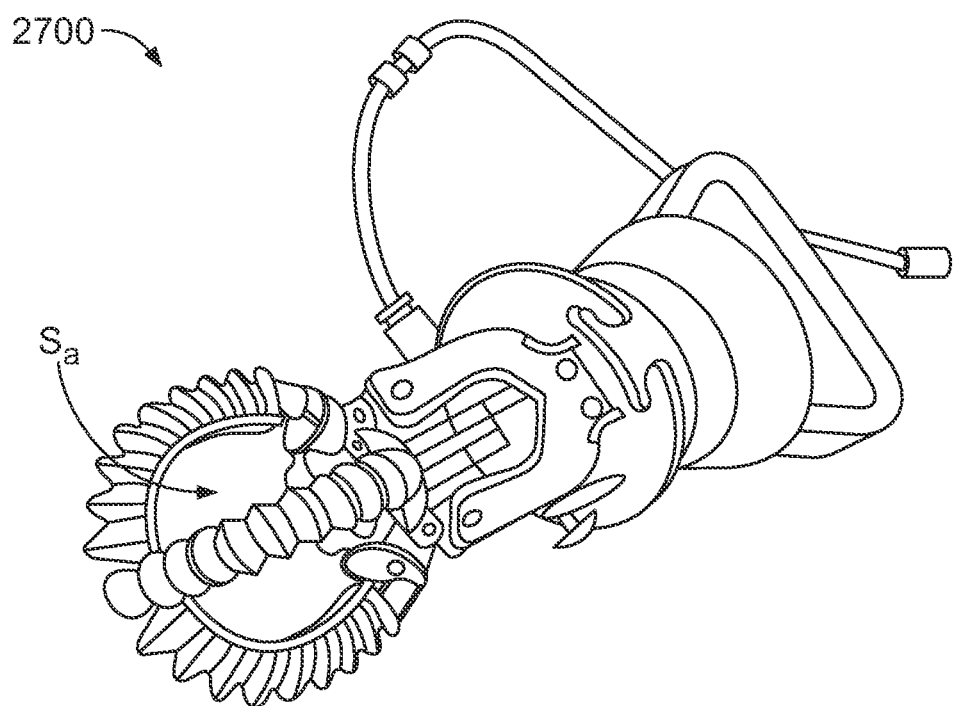

FIGS. 6A-E depict another example of a soft robotic actuator assembly 2700 in which a plurality of actuators 2702a, 2702b, 2702c, and 2702d are mounted to a hub 2704 in an angularly adjustable manner. For example, referring to FIG. 6A, the actuators 2702a-d are shown in a neutral configuration, in which the actuators 2702a-d are disposed in a substantially parallel relationship with one another. FIG. 6B depicts the actuators 2702a-d in the neutral configuration of FIG. 6A with the actuators 2702a-d pressurized (i.e., curved and grasping) to define a generally enclosed space Sn within the actuators 2702a-d. FIG. 6C depicts the actuators 2702a-d in an angularly adjusted configuration, in which the actuators 2702a-d have been pivoted about their respective points of attachment to the hub 2704 to deflect the actuators 2702a-d by respective angles $\theta_a$, $\theta_b$, $\theta_c$, and $\theta_a$ relative to a longitudinal axis y of the hub 2704. The actuators 2702a-d are each shown deflected to an angle of about 30 degrees, though it is contemplated that the actuators 2702a-d can be deflected to any desired angle (e.g., between 0-180 degrees). FIG. 6D depicts the actuators 2702a-d in the angularly adjusted configuration of FIG. 6C with the actuators 2702a-d pressurized (i.e., curved and grasping) to define a generally enclosed space Sa within the actuators 2702a-d. As can be seen, the enclosed space Sa defined by the angularly adjusted configuration of the pressurized actuators 2702a-d is larger than the enclosed space Sn defined by the neutral configuration of the pressurized actuators. Angular adjustment of the actuators 2702a-d may therefore be useful for dynamically configuring the assembly 2700 for approaching and grasping items of various sizes and geometries.

Figure 6E:
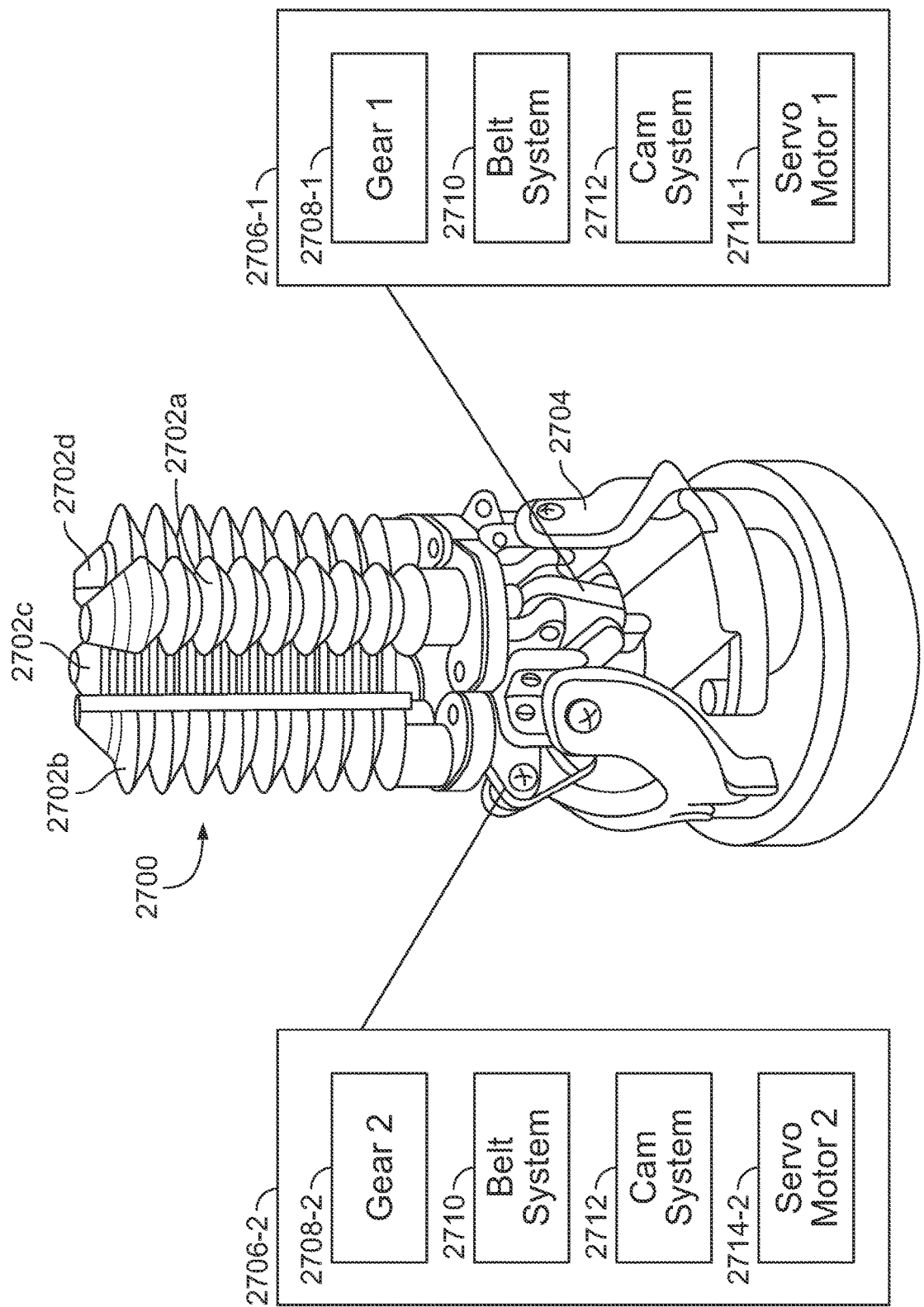

As shown in FIG. 6E, it is contemplated that the angular adjustment of the actuators 2702a-d may be effectuated automatically (e.g., via actuation of one or more servo motors 2714-1, 2714-2 attached to the hub 2704 and the actuators 2702a-d) or manually. It is further contemplated that the angular adjustment of the actuators 2702a-d may be interdependent, such as through a gearing arrangement having gears 2708-1, 2708-2, whereby the angles of deflection $\theta_a$, $\theta_b$, $\theta_c$, and $\theta_a$ are always equal. Alternatively, the angles of deflection $\theta_a$, $\theta_b$, $\theta_c$, and $\theta_a$ may not necessarily be always equal, but may nonetheless be dependent on each other as a result of different gear ratios provided between the gears 2708-1, 2708-2 of the adjustment mechanisms 2706-1, 2706-2 for each actuator (e.g., changing the angle of actuator 2702a to $\theta_a$ may have the effect of changing the angle of actuator 2702b to 20a). In lieu of gears 2708-1, 2708-2, other mechanical options for adjusting the angles of deflection in a dependent manner may be used, such as a belt 2710 or cam 2712 system. It is further contemplated that the angular adjustment of the actuators 2702a-d may be independent, whereby one or more of the angles of deflection $\theta_a$, $\theta_b$, $\theta_c$, and $\theta_d$ may be different from the others in such a way that the respective angles of the actuators do not depend on each other. It is further contemplated that one or more of the actuators 2702a-d may be removed from the hub 2704, or that one or more additional actuators may be attached to the hub 2704 for varying the configuration of the assembly 2700 to better accommodate grasping items of various sizes and geometries.

In other embodiments, the tool-side assembly 20 and/or the soft actuators 30 may include components allowing the actuator spread to be adjusted. For example, FIGS. 7A-7E depict an example of the tool side assembly 20 and attached soft actuators 30. In some examples, a tool side assembly 20 may be provided with the soft actuators depicted in this example to adjust the angle of attack for picking up object.

Figure 7A:
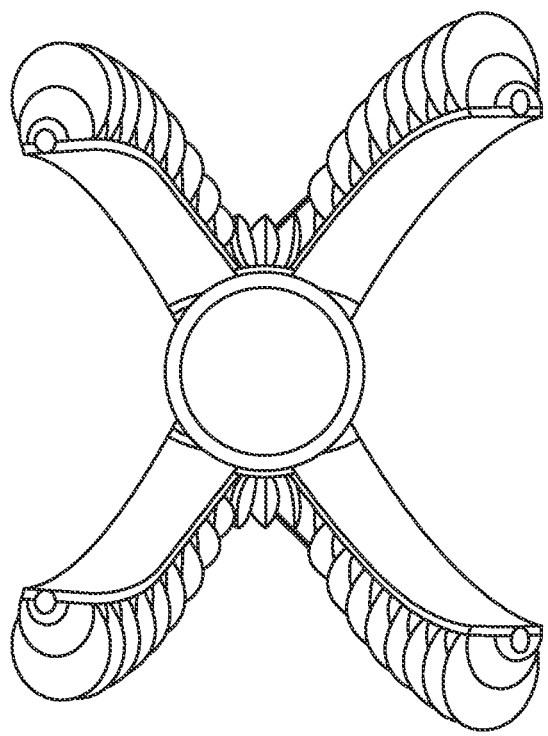
FIGS. 7A-7E are perspective view depicting a soft robotic actuator assembly having a plurality of angularly adjustable gripping actuators and a plurality of adjusting actuators for adjusting the angle of attack of the gripping actuators.
Figure 7A:
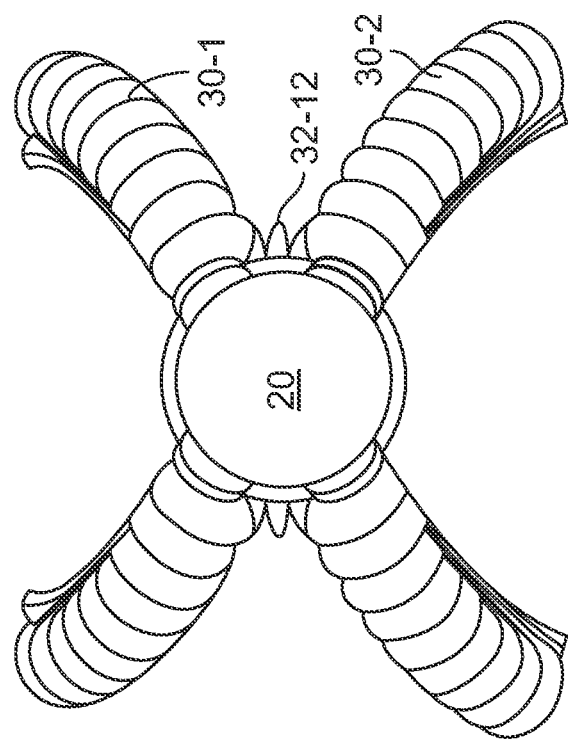
Figure 7B:
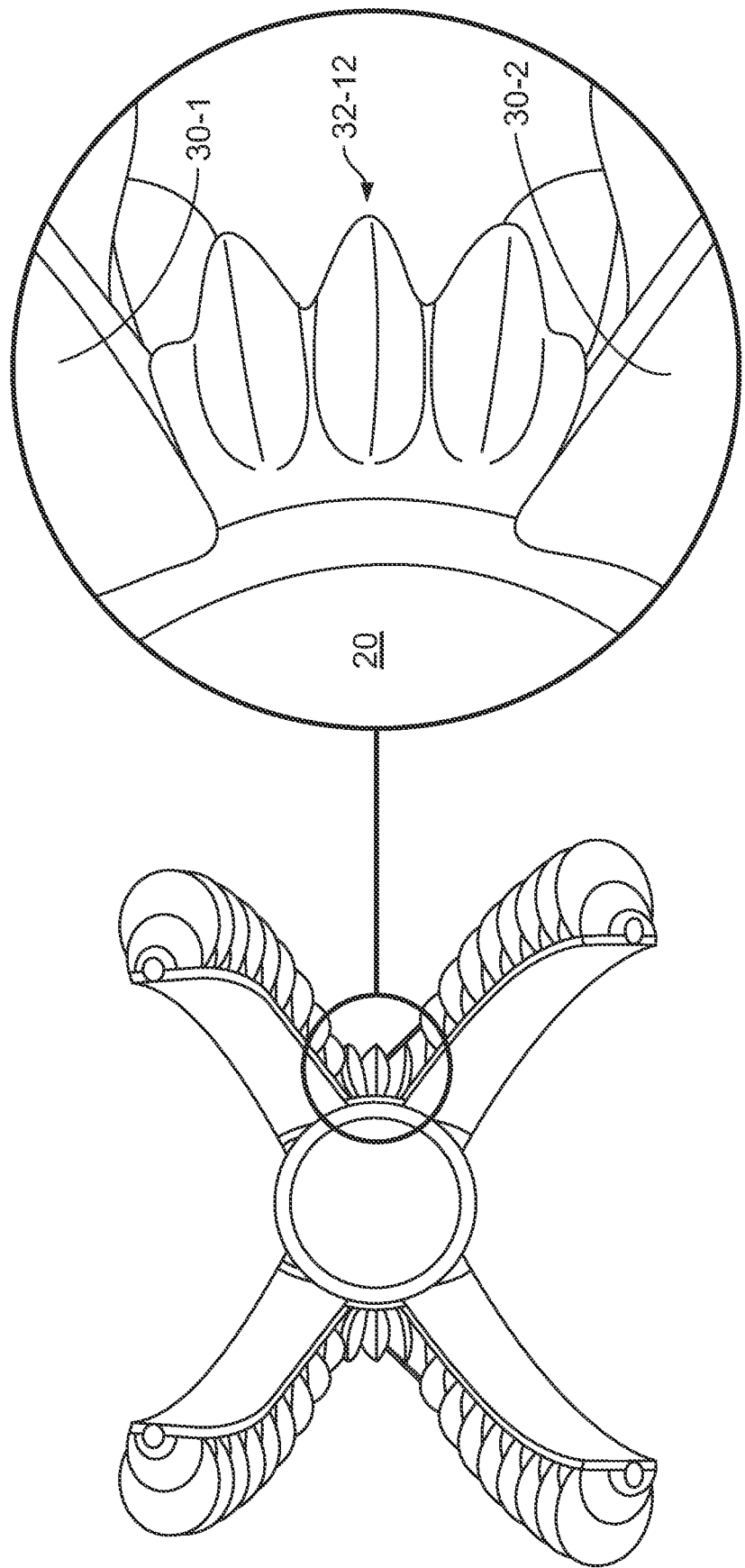

FIG. 7A illustrates the tool side assembly 20 and the soft actuators 30-1, 30-2 from various angles and perspectives. As depicted, the soft actuators 30-1, 30-2 include soft angle adjustors 32-12. FIG. 7B illustrates a bottom view of the tool side assembly 20 with the soft actuators 30-1, 30-2 attached and a magnified view 200 of the soft angle adjustors 32-12. As can be seen, the soft angle adjustors 32-12 are disposed laterally between the soft actuators 30-1, 30-2. During operation, the soft angle adjustors 32-12 can be independently inflated and deflated (e.g., independent from each other and/or independent from the soft actuators) to adjust the angle between the soft actuators 30-1, 30-2.

Figure 7C:
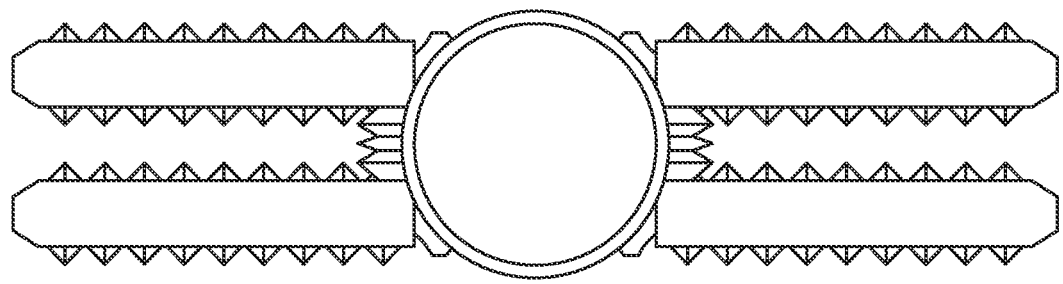
Figure 7D:
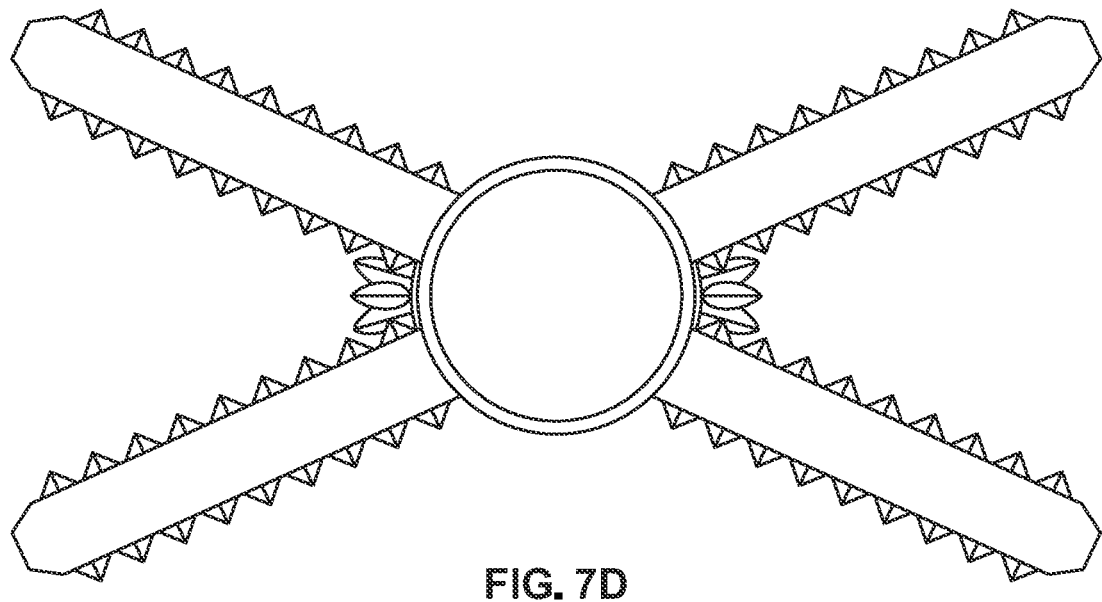
Figure 7E:
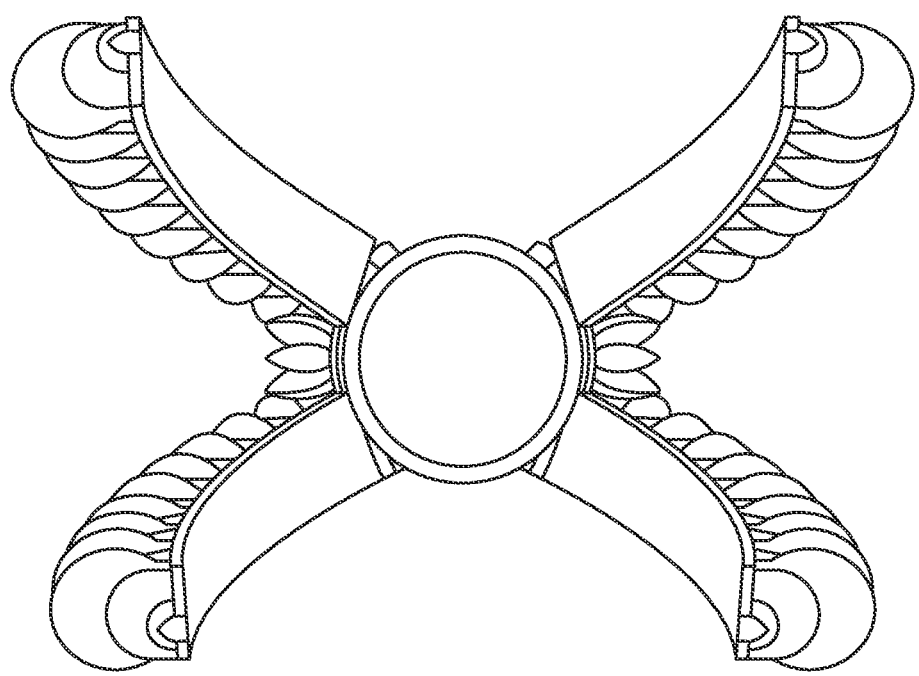

FIG. 7C-7E illustrate the soft actuators 30-1, 30-2 and soft angle adjustors 32-12 in various states. In particular, FIG. 7C illustrates the soft actuators 30-1, 30-2 in a neutral position and the soft angle adjustors 32-12 deflated. As such, the angle between pairs of the soft actuators 30-1, 30-2 (e.g., between 30-1 and 30-2 and between 30-3 and 30-4, or the like) is reduced. FIG. 7D illustrates the soft actuators 30 in a neutral position and the soft angle adjustors 32 inflated. As such, the angle between pairs of the soft actuators 30 (e.g., between 30-1 and 30-2 and between 30-3 and 30-4, or the like) is increased. FIG. 7E illustrates the soft actuators 30 in an inflated position and the soft angle adjustors 32 inflated. As such, the angle between pairs of the soft actuators 30 (e.g., between 30-1 and 30-2 and between 30-3 and 30-4, or the like) is increased and the angle of attack of the inflated soft actuators 30 is also increased.

Although FIGS. 7A-7E depict an example in which the spread is being changed by the action of a soft actuator, one of ordinary skill in the art will recognize that other methods for changing the spread are also possible. For example, in some embodiments, a spring may hold the actuators apart. The spring may be connected to a locking crank mechanism that works in operation to the spring. When operating the crank in one direction, the crank compresses the spring to bring the actuators together; when operating the crank in the opposite direction, the crank releases the spring to bring the actuators apart.

In other embodiments, other mechanical, electromechanical, or pneumatic devices may be used to change the spread of the actuators.

Rigidizing Layer

Further embodiments provide an anisotropic reinforcement base incorporating one or more rigid components such as slats. The components may be made of metal, plastic, or any other suitably rigid material. The rigid components may be strapped, wrapped, adhered, or molded directly into the actuators to prevent bowing in the strain limiting layer, which makes it more difficult for the actuator to bend in a positive direction (toward a gripped object) when pressure is applied. The rigid components also serve to prevent cavitation of a grip surface, which makes it difficult to bend in a negative direction when a vacuum is applied. In this case, the rigid components may be molded into or adhered onto the fingers, in order to prevent the cavitating surface from pulling away from the slats.

More specifically, some actuators incorporate elastomers of differing stiffness or wall thickness to accommodate a certain desired behavior. This layer of varying thickness or stiffness is sometimes referred to as a strain limiting layer.

Turning to FIGS. 8A-8F, reinforced actuators for preventing bowing in a strain limiting layer are now described. The strain limiting layer of a soft actuator can have the tendency to bow away from the neutral bending plane of the actuator during inflation. This bowing of the strain limiting layer increases the second moment of area of the actuators cross section thereby increasing the actuators resistance to bending. This behavior diminishes the function of the actuator.

This problem can be mitigated by overmolding rigid elements (e.g. plastics, metals, ceramics, or stiffer elastomers) in to the strain limiting layer. This is accomplished by placing a plurality of rigid elements into the strain limiting layer where the long axis of each element is oriented perpendicular to the neutral axis of bending. This orientation allows the rigid elements to prevent bowing of the strain limiting layer in the direction perpendicular to the neutral axis but only minimally impedes bending along the neutral axis.

Figure 8A:
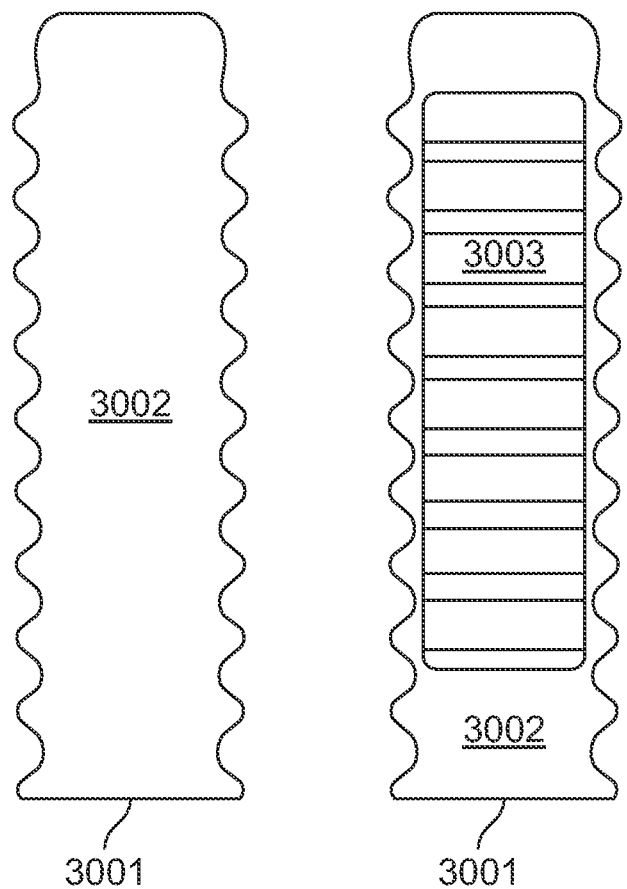
FIGS. 8A-8F depict exemplary reinforcement structures for reinforcing a soft actuator.
Figure 8B:
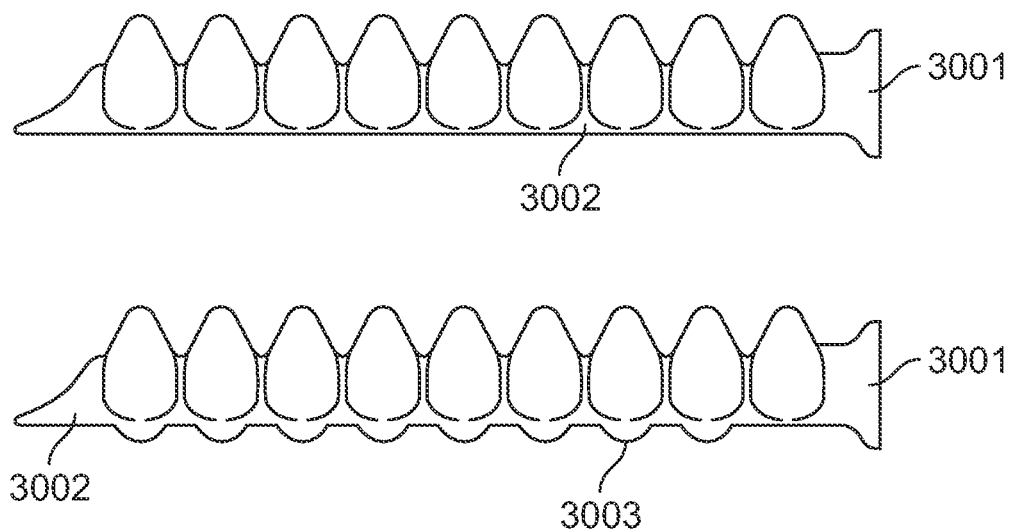

The rigid elements may be held in place between the strain limiting layer of the soft actuator body and an overmolded encapsulating elastomer layer. FIG. 8A depicts side-by-side bottom views of a soft actuator body 3001 without an encapsulating elastomer layer on the strain limiting layer 3002 (left), and the same soft actuator body having an encapsulating elastomer layer 3003 (right). The encapsulating elastomer layer 3003 may be made of the same materials as the soft actuator body (e.g., the same elastomer materials), or may be made of a relatively more rigid material. FIG. 8B depicts side-by-side side views of the soft actuator body 3001 with and without the encapsulating elastomer layer 3003 on the strain limiting layer 3002 (top and bottom, respectively).

In some embodiments, the encapsulating elastomer layer 3003 may overlay reinforcing slats 3004 in order to prevent bowing in the strain limiting layer 3002. The soft actuator body 3001 may be provided with molded trenches 3005 for receiving the reinforcing slats 3004. Alternatively or in addition, the molded trenches 3005 may be located in the encapsulating elastomer layer 3003, or trenches 3005 may be located both in the soft actuator body 3001 and the encapsulating elastomer layer 3003. In assembly, the reinforcing slats may be slotted into the trenches 3005 and overlaid with the encapsulating elastomer layer 3003. The slats 3004 may be made of a relatively rigid material or materials as compared to the soft actuator body 3001, such as plastics, metals, ceramics, or stiffer elastomers.

Figure 8C:
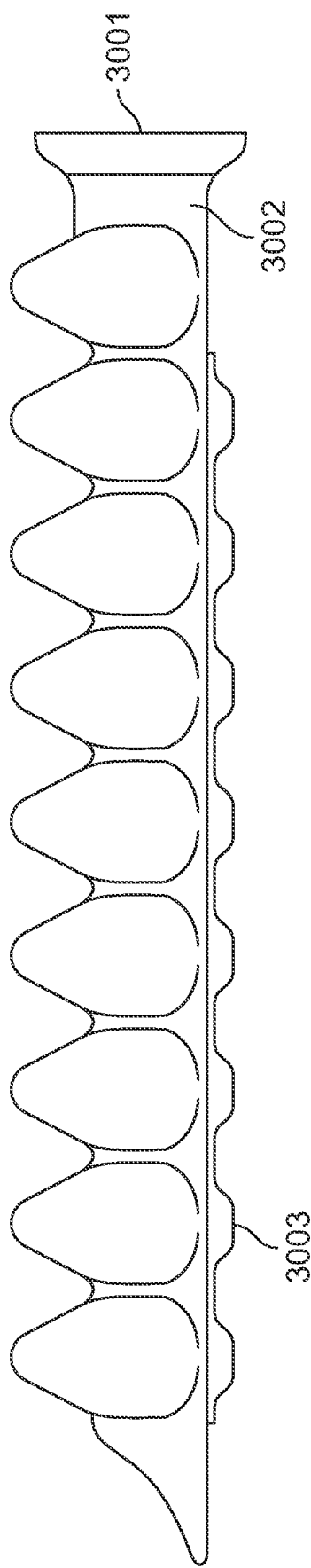
Figure 8D:
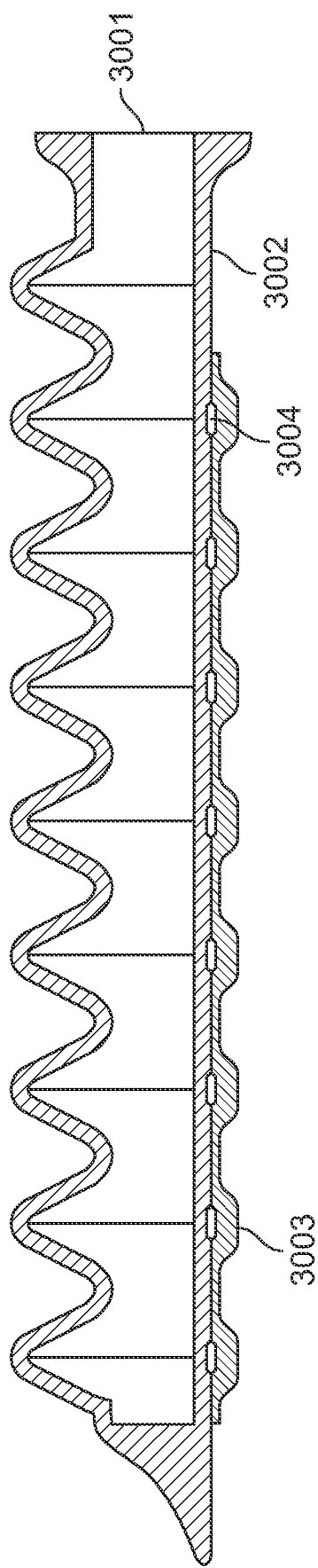
Figure 8E:
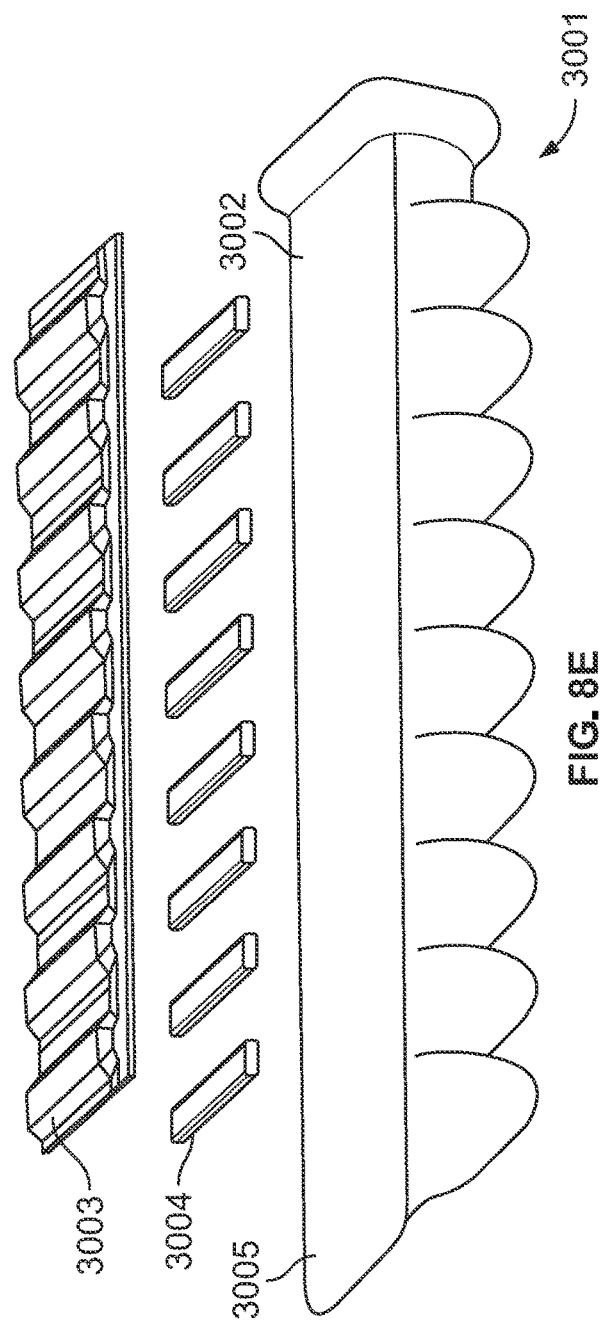

FIG. 8C depicts the side of the soft actuator body 3001 having an encapsulating elastomer layer 3003, and FIG. 8D is a cross-sectional view of the actuator depicted in FIG. 8C, showing the location of the rigid slats 3004. FIG. 8E is an exploded view showing the rigid slats 3004 between the strain limiting layer 3002 and the encapsulating elastomer layer 3003.

Figure 8F:
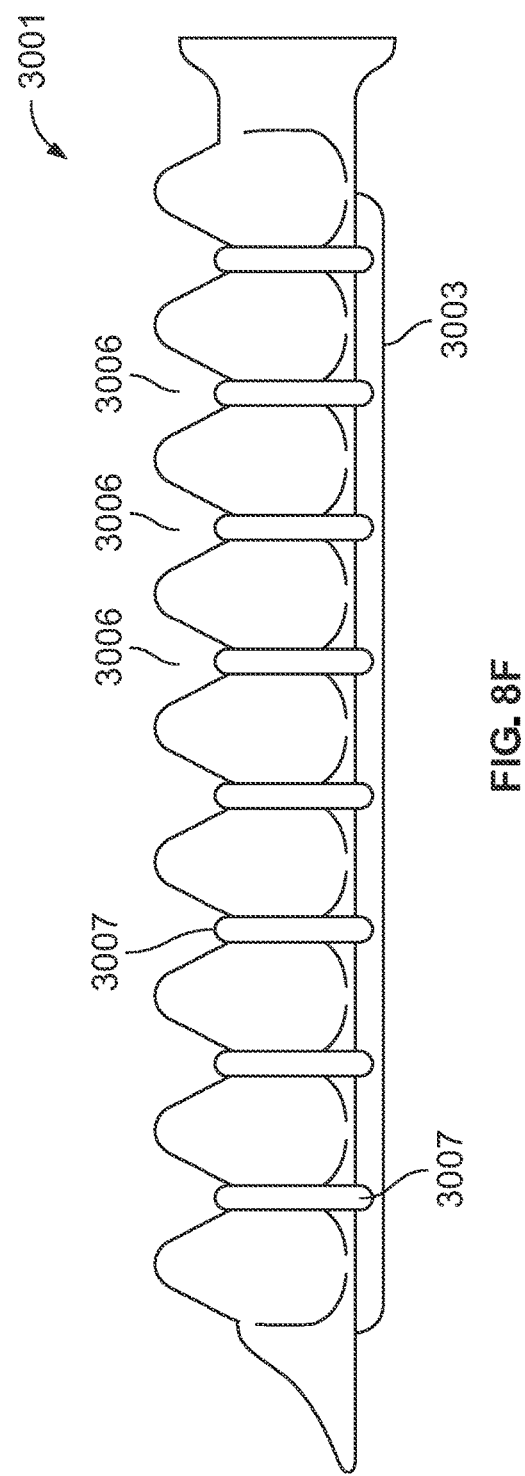

FIG. 8F depicts an example of a soft actuator body 3001 having an encapsulating elastomer layer 3003, and furthermore having overmolded rigid or elastomeric structures 3007 for reinforcing the accordion troughs 3006 of the soft actuator bladder. The structures 3007 serve to minimize or reduce strain at the accordion troughs 3006. The pressure of inflation of the soft actuator body 3001 may cause the troughs 3006 of an accordion-shaped soft actuator to strain. This generates points of stress concentration in the troughs 3006 which at elevated pressure can lead to the failure of the actuator. Nonetheless, elevating the inflation pressure of an actuator is desirable since this increases the force that can be delivered by the actuator when it is used as part of a gripper or the rigidity of the actuator when it is used as a structural element in an application. As a result it is desirable to reinforce these troughs with rigid materials (e.g. plastics, metals, ceramics, or stiffer elastomers) in order to minimize the straining of the actuator at these points when it is operated at elevated pressures.

Figure 9A:
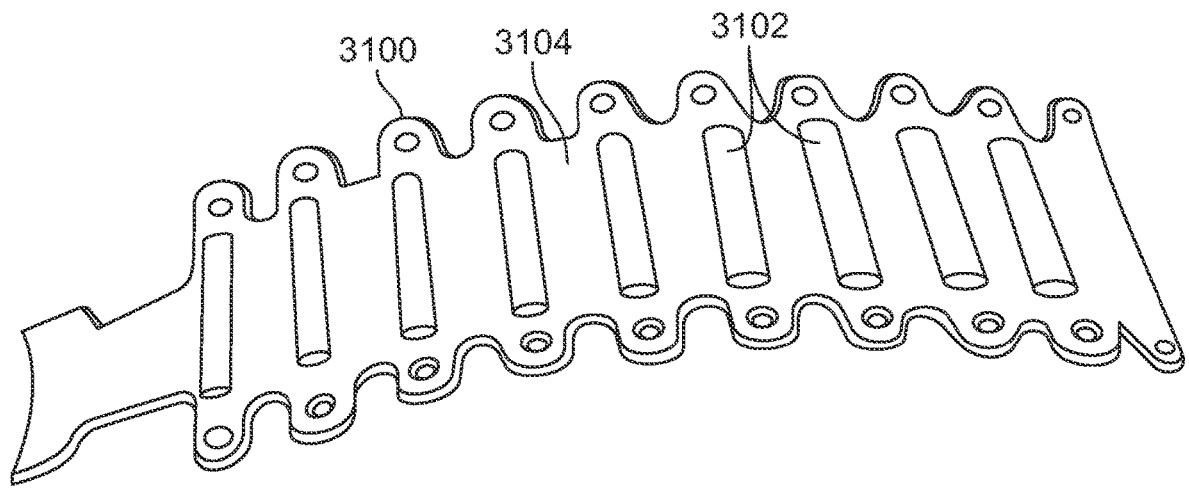
FIGS. 9A and 9B are perspectives view depicting an exemplary reinforcing layer.
Figure 9B:
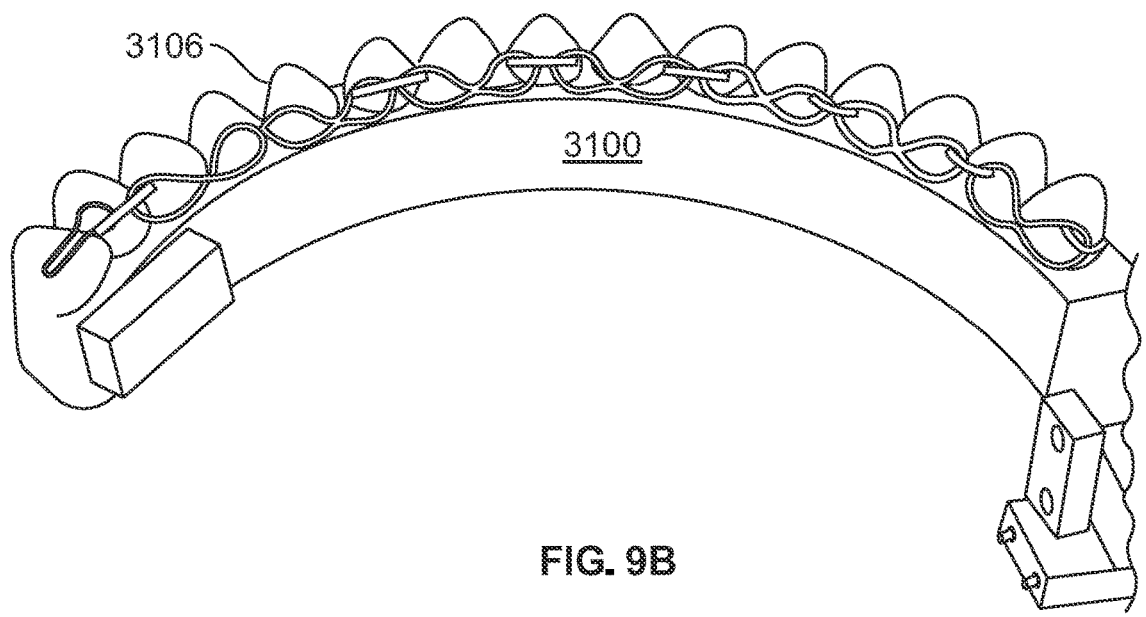

FIG. 9A depicts an exemplary rigidizing layer 3100 that includes a plurality of rigid slats 3102 that are affixed to a flexible backing 3104 in a parallel, spaced-apart relationship. The slats 3102 may be formed of any suitably rigid material, including, but not limited to, various metals, plastics, and composites. As shown in FIG. 9B, the rigidizing layer 3100 can be affixed to a grasping side of an actuator 3106 (the slats 3102 are facing the actuator 3106 and are therefore not visible in this view) using various means of attachment, such as with laces (as shown), adhesives, mechanical fasteners, stiff O-rings (e.g., O-rings constructed of Shore 80 A or Shore 90 A elastomer), etc. The means of attachment may connect across the troughs of the accordion extensions of the actuators. In some embodiments, the flexible backing 3104 can be omitted and the rigid slats 3102 can be integrated into the material of the actuator 3106 itself (e.g., by over-molding).

With the rigidizing layer 3100 applied to the grasping side of the actuator 3106 in the above-described manner, the rigid slats 3102 prevent the grasping side of the actuator 3106 from bulging or becoming convex when the actuator 3106 is pressurized, wherein such bulging could impede the ability of the actuator 3106 to bend inward when attempting to grasp an item. Moreover, the rigid slats 3102 may prevent the grasping side of the actuator 3106 from cavitating or becoming concave when a vacuum is applied to the actuator 3106, wherein such cavitating could otherwise impede the ability of the actuator 3106 to bend outward when attempting to open away from an item. Since the rigid slats 3102 are spaced apart from one another and are perpendicular to the directions in which the actuator 3106 bends during opening and closing, the rigid slats 3102 do not impede or interfere with the regular operation of the actuator 3106.

The troughs between accordion extensions tend to be the points of highest stress concentration. The above-noted laces serve to prevent this region from expanding under pressure, which helps to prevent a failure of the actuator. This is achieved by preventing the actuator from bulging away from a neutral bending plane.

Force Amplification

Next described are force amplification structures for amplifying the force at the distal tip of the inflated actuator as compared to an actuator that does not employ such force amplification structures.

A force amplification structure may cause the deflectable area of the actuator to be shortened. From beam theory it is understood that, for the same actuation pressure a shorter actuator requires more force to be deflected the same distance as a longer actuator of equivalent cross section. As applied to a gripping actuator, the force of gripping comes from the fact that the object being grasped prevents the actuator from achieving the degree of bending that the actuator would have achieved if the actuator were unobstructed. Thus, the grasp target that is obstructing the actuator is effectively deflecting the actuator. The equal and opposite force to this deflection is the force of grasping.

The force amplification structures may include a ring, cuff, cylinder, rod, accordion-like structure, etc., which hold one or more actuators together and provides static or adjustable constraint along the length of the actuators. The force amplification structures may be attached to the actuator(s), or made integral with the actuator(s) (e.g., by molding the force amplification structures into the acutuator(s)). The force amplification structures may include one or more sensors to allow the amount of force amplification to be dynamically adjusted.

Multiple force amplification structures may be combined to achieve desired force application profiles. The configuration, type, and number of force amplification structures may be varied between actuators or may be changed on the same actuator to achieve different force amplification results.

The force amplification structures may also serve to make the shortened actuator more stable. When a gripper is accelerated or decelerated (e.g., in order to move a grasped object from one location to another), the actuators may tend to sway. In some applications, particularly where placement accuracy is important, swaying of the actuator may be undesirable because it becomes difficult to predict where an object may be placed. Shorter actuators tend to sway less under the same force of acceleration or deceleration as compared to longer actuators, because it requires more force to deflect a shorter actuator an equivalent distance as compared to a longer actuator having the same cross-sectional area. Therefore, by reducing the effective length of the actuators (e.g., by attaching a force amplification structure), the swaying may be reduced. Thus, shortening the actuator (s) of a gripper to the smallest possible length for a given gripping task at hand (e.g., by using a force amplification band) may be useful for reducing or eliminating sway during operation, in turn improving picking and placing accuracy.

The force amplification structure may be secured directly to the hub holding the actuators (e.g., through a mechanical connection such as one or more beams secured to the force amplification structure and the hub). This helps to prevent the actuator as a whole from swaying by leaving only the shortened grasping end of the actuator free to move.

The force amplification structures may also serve to stabilize one or more actuators against twisting and/or overlapping. When picking up a relatively small object, typically only the tip of the actuator will be used to grasp the target. As a result, much of the middle and proximal portion of the actuator sits in free space, without any matter obstructing these portions of the actuator. The portions of the actuator that are unobstructed may have a tendency to twist or overlap with each other, which makes it difficult to precisely control a gripper including the twisted or overlapping actuators.

Another advantage of the force amplification structures described herein is that they may change the profile of an actuator, and therefore change the degree of conformal contact between a grasped target and the actuators grasping the target. As a result, the actuators can achieve a higher degree of surface contact with the target as compared to an non-force-amplified actuator. This increased contact means more friction between the actuators and the grasped target, and in turn a better grip. Thus the force amplification structures may change the geometric profile of a gripper having one or more actuators, in order to tune the gripper to the gripping of an object of a particular shape that is not well grasped by an non-force-amplified structure.

Figure 10A:
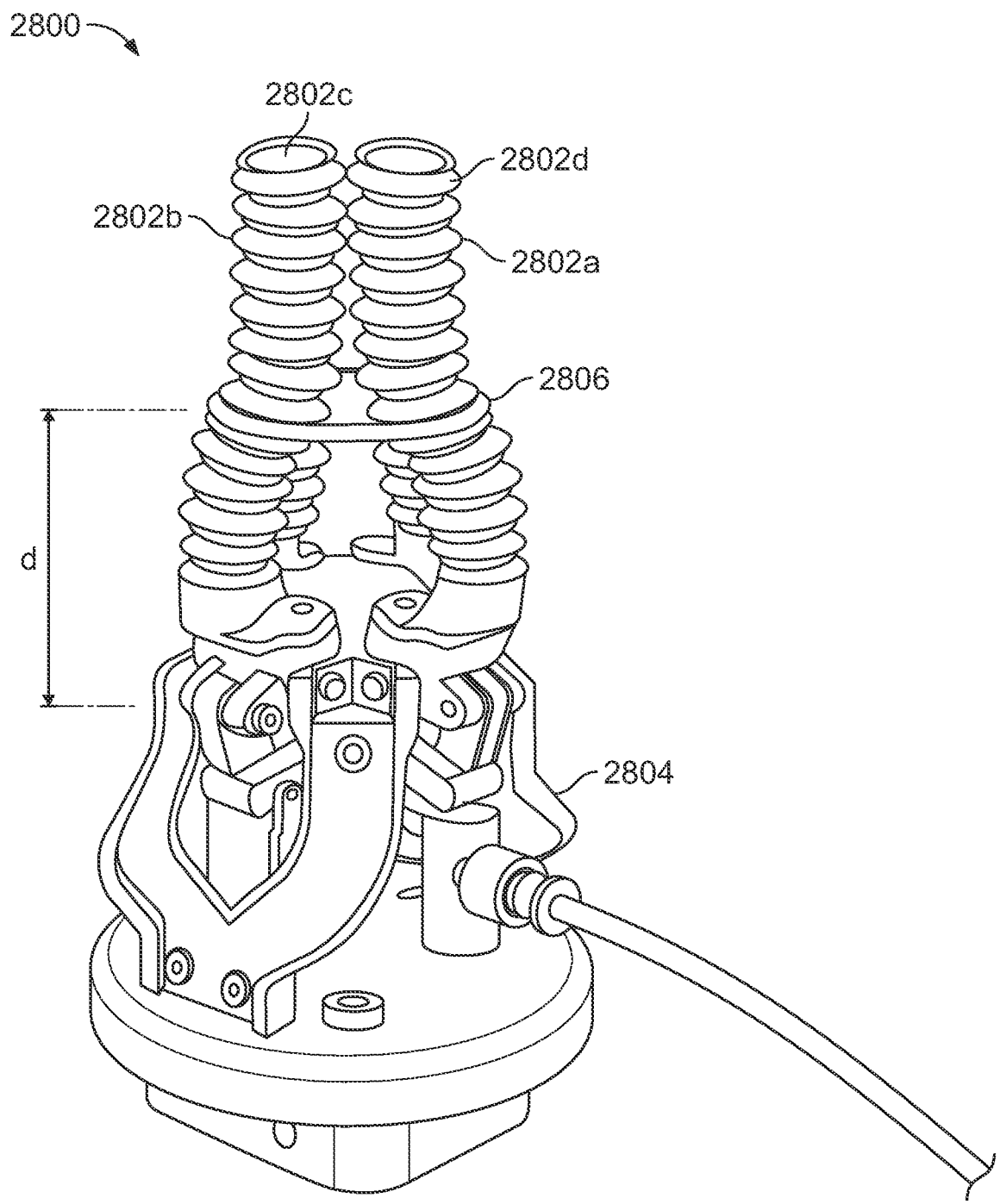
FIG. 10A is a perspective view depicting a soft robotic actuator assembly having a plurality of actuators surrounded by a force amplification band.

FIG. 10A depicts an example of a soft robotic actuator assembly 2800 in which a plurality of actuators 2802a, 2802b, 2802c, and 2802d are mounted to a hub 2804, and in which a force amplification band 2806 surrounds the actuators 2802a-d. The force amplification band 2806 may be a rigid or flexible member (e.g., formed of metal, plastic, rubber, fabric, various composites, etc.) having the general shape of a ring or a cuff (or multiple, interconnected rings/cuffs as further described below). The force amplification band 2806 may surround and constrain the actuators 2802a-d at a longitudinal position located a distance d from the hub 2804. By constraining the actuators 2802a-d thusly, the moment arm of each actuator 2802a-d is shortened and, when the actuators 2802a-d are pressurized, the normal force applied by the tip of each actuator 2802a-d on a grasped item is increased. The force amplification band 2806 may therefore be used to enhance the grip strength of the actuators 2802a-d.

In addition to increasing the normal force exerted at the tip of each actuator 2802a-d, the force amplification band 2806 also constrains outward bowing of the actuators 2802a-d relative one another compared to an unconstrained configuration, thereby causing the distal portions of the actuators 2802a-d to take on flatter profile when they pressurized relative to when the is no force amplification band 2806 in place. Such a flattened profile may be suitable for grasping items of particular sizes or geometries. Still further, the force amplification band 2806 serves to stabilize the actuators 2802a-d to mitigate twisting, overlapping, and/or misalignment of the actuators 2802a-d when they are pressurized.

Figure 10B:
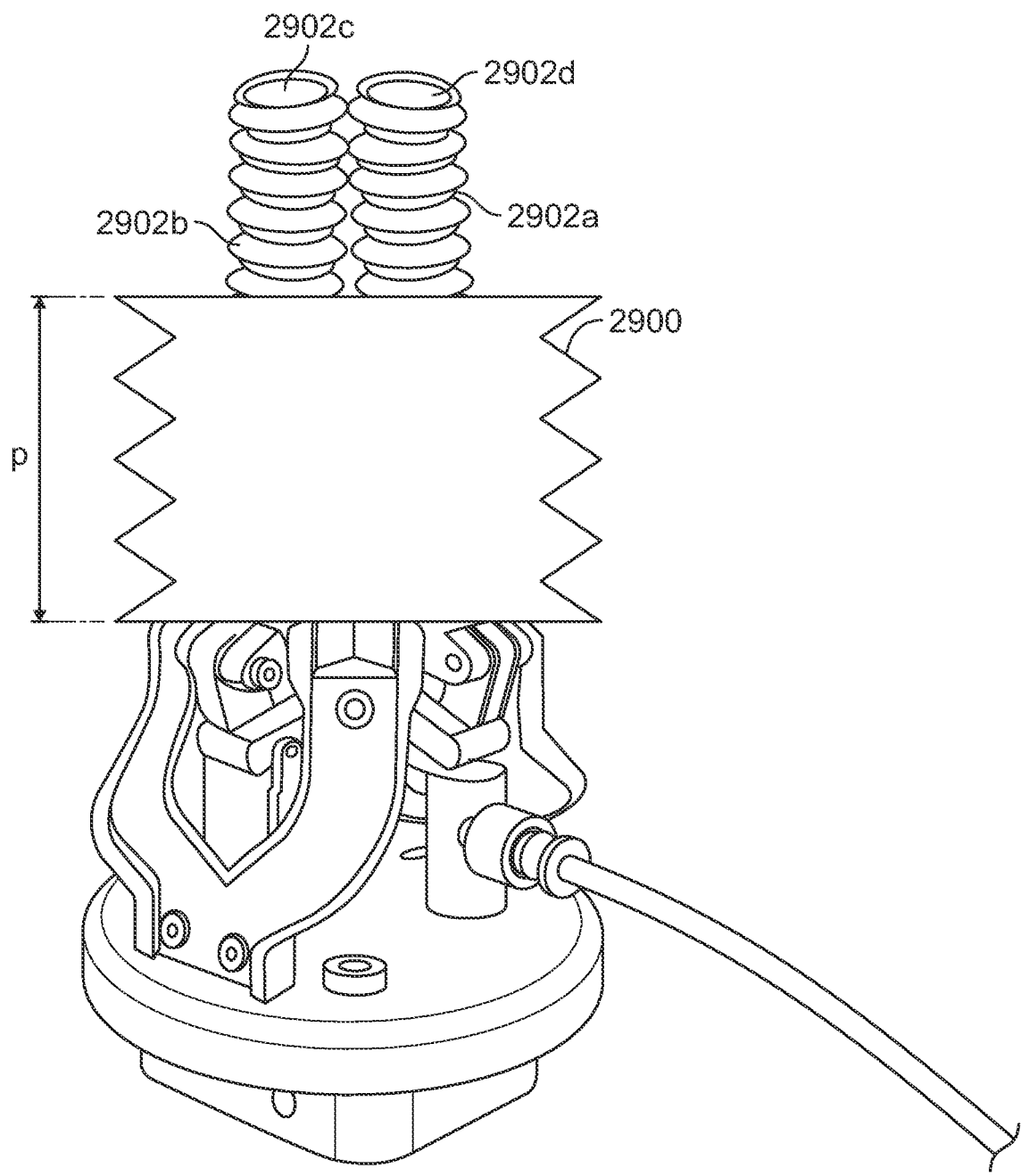
FIG. 10B is a perspective view depicting a soft robotic actuator assembly having a plurality of actuators surrounded by an automatically adjustable force amplification band.

It is contemplated that the longitudinal position of the force amplification band 2806 along the actuators 2802a-d can be adjusted manually or automatically. For example, FIG. 10B depicts a force amplification band embodied by an adjustable cuff or bellows 2900 that can be longitudinally extended and retracted automatically (e.g., via various electrical, hydraulic, or pneumatic drive mechanisms) to constrain a group of actuators 2902a-d at a variable longitudinal position p.

Figure 10C:
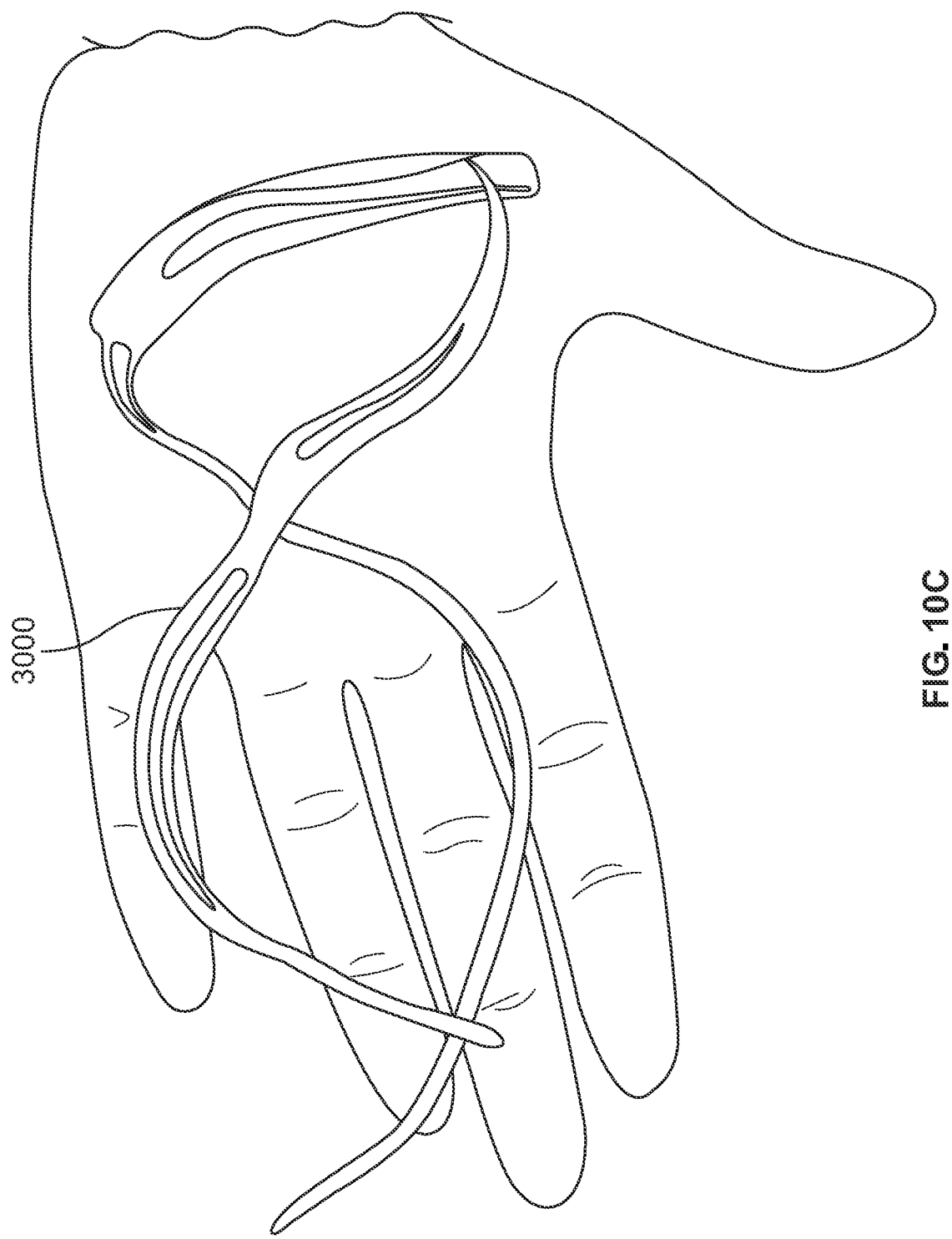
FIG. 10C is a perspective view depicting an exemplary figure-8 force amplification band.

FIG. 10C depicts a force amplification band embodied by a flexible strap 3000 having a figure-8 shape that defines two loops. Each loop may be used to constrain one or more actuators in the manner described above for providing force amplification and/or stabilization. The force amplification band 3000 represents a 1×2 configuration, though it is contemplated that many other force amplification band configurations (e.g., 2×2, 1×4, 2×4, etc.) may be implemented for constraining various numbers and arrangements of actuators without departing from the present disclosure. Alternatively or in addition, the flexible strap 3000 may have other shapes or configurations, such as a square, circular, elliptical, or triangular shape.

Gripping Structures

In some embodiments, the soft robotic actuators may be designed with, or supplemented with, one or more gripping structures to customize the actuators' gripping profile. This may allow the actuator to better conform to the surface to be gripped, or to have structures or textures that improve the actuator's gripping capabilities.

The gripping structure may be a conformal pad or other component that is either attached to, or integral with, the gripping-side surface of the actuator. A gripping pad may have any type of textured surface, with a variety of different frictional shear forces being possible. Different actuators attached to the same hub may have different gripping structures. Alternatively or in addition, the same actuator may have multiple different gripping structures located at different locations on the actuator to allow the actuator to grip an object in a desired manner. The number, type, and configuration of gripping structures may be selected based on a size, shape, or texture of an object to be gripped.

Figure 11A:
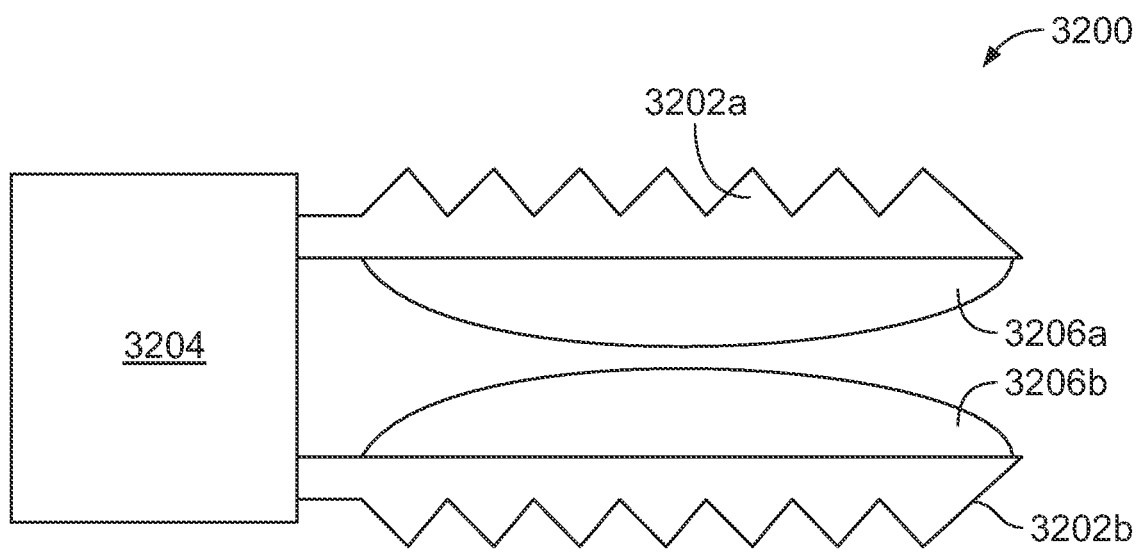
FIGS. 11A-11F are side views illustrating soft robotic actuators provided with various exemplary gripping pads, textures, and tools.

FIG. 11A depicts a soft robotic actuator assembly 3200 in which a two actuators 3202a and 3202b are mounted to a hub 3204, and in which the actuators 3202a and 3202b are provided with respective gripping pads 3206a and 3206b. The gripping pads 3206a and 3206b may be integral with actuators 3202a and 3202b (i.e., formed as parts of the actuators 3202a and 3202b) or may be removably affixed to the actuators (e.g., with mechanical fasteners, adhesives, etc.), and may have a shape, an arrangement, a texture, and/or may be formed of a material that is adapted to enhance the ability of the actuators 3202a and 3202b to grasp and hold particular items.

Figure 11B:
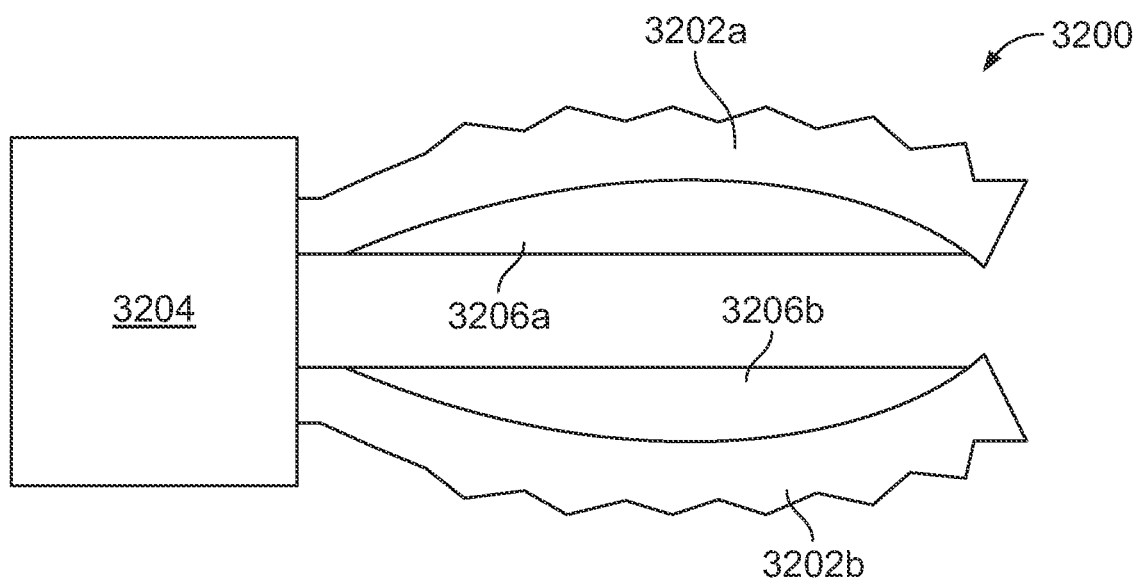

In the example shown in FIG. 11A, the gripping pads 3206a and 3206b may be formed of a resilient, compressible material (e.g., foam rubber) and may each have a gripping surface that is convex when the actuators 3202a and 3202b are not pressurized (i.e., when the actuators 3202a and 3202b are substantially straight). However, when the actuators 3202a and 3202b are pressurized as shown in FIG. 11B, the flexed actuators 3202a and 3202b may compress the gripping pads 3206a and 3206b and thereby cause the gripping surfaces to become substantially flat and parallel, which may be advantageous for gripping substantially planar items such as books.

Figure 11C:
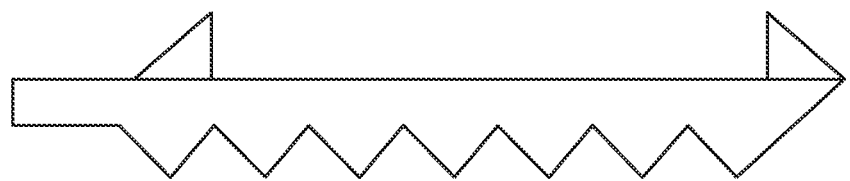
Figure 11D:
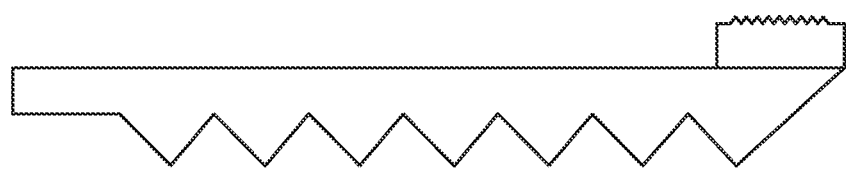
Figure 11E:
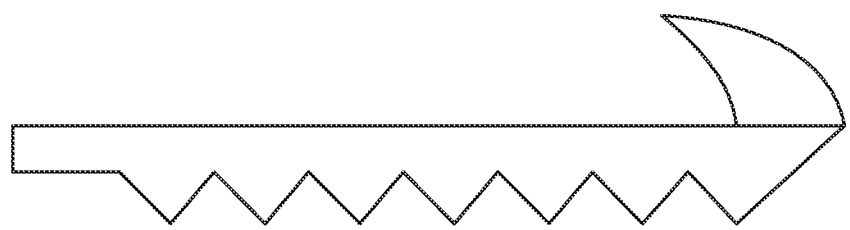

FIGS. 11C-11E depict additional, non-limiting examples of actuators having gripping pads of various shapes and configurations. As previously stated, the gripping pads may, in addition to having various shapes and configurations, be provided with various surface textures (ridged, waffled, concentric circular, diamond, etc.) or shapes (e.g., hook, wedge, etc.) that may assist in gripping particular items.

Figure 11F:
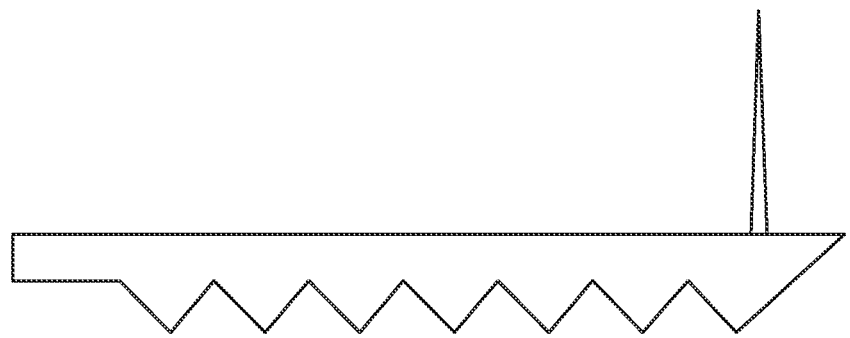

FIG. 11F depicts a further example of an actuator having a gripping structure in the form of a needle or other relatively long and thin pin-like structure. The needle may allow the actuator to grip a relatively soft food item, such as a cupcake, dough ball, or cheese ball by inserting the needle into the food item in order to lift the food item with the actuator. The needle may be overmolded into the tip of the actuator, or may be attached to a wrap that at least partially surrounds the actuator. Although FIG. 11F depicts a single needle, an actuator may be provided with multiple needles mounted in any suitable configuration.

Terminology

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

While the present invention has been disclosed with reference to certain embodiments, numerous modifications, alterations and changes to the described embodiments are possible without departing from the sphere and scope of the present invention, as defined in the appended claim(s). Accordingly, it is intended that the present invention not be limited to the described embodiments, but that it has the full scope defined by the language of the following claims, and equivalents thereof.

The invention claimed is:

1. An apparatus comprising:
   a master-side assembly comprising a master-side interface; and
   a tool-side assembly comprising:
      a tool-side interface configured to releasably couple the tool-side assembly to the master-side interface of the master-side assembly;
      a soft actuator comprising a hollow body including an elastomeric material and configured to:
         transition from an unactuated configuration to an actuated configuration upon application of an inflation fluid, and
         move linearly relative to another soft actuator of the apparatus; and
      an actuator attachment portion comprising an angular adjustment device disposed between, and adjacent to, the soft actuator and the tool-side interface and configured to adjust an angle of the soft actuator relative to a longitudinal axis extending through the apparatus.

2. The apparatus of claim 1, wherein the master-side assembly further comprises a mechanical assembly configured to connect the master-side assembly to gantry.

3. The apparatus of claim 1, wherein the master-side interface and tool-side interface each comprise a seal.

4. The apparatus of claim 3, wherein the seals are configured to allow a sealed pathway for inflation fluid between the master-side assembly and the tool-side assembly.

5. The apparatus of claim 1, wherein the master-side interface and tool-side interface are configured to releasably couple through a twist-lock interface.

6. The apparatus of claim 1, wherein the angular adjustment device comprises a rotatable component.

7. The apparatus of claim 6, wherein the angular adjustment device is configured to rotate with respect to the master-side assembly to change a relative angle between an attached actuator and the master-side assembly.

8. The apparatus of claim 1, wherein the apparatus comprises a plurality of tool-side assemblies.

9. The apparatus of claim 8, wherein each respective angular adjustment device is configured to independently adjust the angle of the actuator attached to the respective angular adjustment device.

10. The apparatus of claim 8, wherein at least one of the angular adjustment devices is configured to interdependently adjust the angle at least two of the actuators.

11. The apparatus of claim 8, wherein at least one of the angular adjustment devices is configured to adjust the angle of at least two of the actuators unequally but proportionally to each other.

12. The apparatus of claim 1, further comprising a control device configured to transmit a control signal to the apparatus, wherein the control signal is configured to define a target angle for at least one of the angular adjustment devices.

13. The apparatus of claim 1, wherein the angular adjustment device includes an electrical component.

14. The apparatus of claim 1, wherein the angular adjustment device includes at least one of a mechanical, pneumatic, or hydraulic component.

15. The apparatus of claim 1, wherein the angular adjustment device is configured to rotate inwards towards a center of the master-side assembly or outward away from the center of the master-side assembly.

16. A method comprising:
   providing an apparatus according to claim 1; and
   transmitting a control signal to the least one angular adjustment device to cause the at least one angular adjustment device to rotate.

17. The method of claim 16, further comprising removing one of the plurality of soft actuators from the master-side assembly.

18. The method of claim 16, further comprising moving the soft actuator linearly relative to the other soft actuator of the apparatus.

19. The method of claim 16, wherein the control signal is configured to cause angular adjustment device to rotate to a different angle from a second angular adjustment device.

20. The method of claim 19, wherein the different angle is dependent upon an angle of the second angular adjustment device.

* * * * *